US011680161B2

(12) United States Patent
Wittenberg et al.

(10) Patent No.: US 11,680,161 B2
(45) Date of Patent: Jun. 20, 2023

(54) THERMOPLASTIC MOLDING COMPOSITION AND ARTICLES MADE THEREOF HAVING IMPROVED SURFACE QUALITY

(71) Applicant: INEOS STYROLUTION GROUP GMBH, Frankfurt am Main (DE)

(72) Inventors: Nils Wittenberg, Hofheim am Taunus (DE); Gisbert Michels, Leverkusen (DE); Tobias Schulz, Cologne (DE); Wolfgang Fischer, Walldorf (DE); Lena Grassberger, Cologne (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 361 days.

(21) Appl. No.: 16/762,645

(22) PCT Filed: Nov. 12, 2018

(86) PCT No.: PCT/EP2018/080907
§ 371 (c)(1),
(2) Date: May 8, 2020

(87) PCT Pub. No.: WO2019/092237
PCT Pub. Date: May 16, 2019

(65) Prior Publication Data
US 2020/0362152 A1 Nov. 19, 2020

(30) Foreign Application Priority Data
Nov. 13, 2017 (EP) .................................. 17201302

(51) Int. Cl.
| | | |
|---|---|---|
| *C08F 6/22* | (2006.01) | |
| *C08K 3/32* | (2006.01) | |
| *C08L 55/02* | (2006.01) | |
| *C08L 25/12* | (2006.01) | |
| *C08K 5/00* | (2006.01) | |
| *C08L 51/04* | (2006.01) | |
| *C08F 279/02* | (2006.01) | |
| *C08L 51/00* | (2006.01) | |
| *C08K 3/26* | (2006.01) | |
| *C08K 5/092* | (2006.01) | |

(52) U.S. Cl.
CPC ............... *C08L 25/12* (2013.01); *C08F 6/22* (2013.01); *C08F 279/02* (2013.01); *C08K 5/0083* (2013.01); *C08L 51/003* (2013.01); *C08L 51/04* (2013.01); *C08L 55/02* (2013.01); *C08K 5/092* (2013.01); *C08K 2003/262* (2013.01); *C08K 2003/321* (2013.01); *C08K 2003/324* (2013.01); *C08K 2003/329* (2013.01)

(58) Field of Classification Search
None
See application file for complete search history.

(56) References Cited

U.S. PATENT DOCUMENTS

| | | |
|---|---|---|
| 3,419,634 A | 12/1968 | Vaughn et al. |
| 3,553,167 A | 1/1971 | Schnell et al. |
| 3,692,744 A | 9/1972 | Rich et al. |
| 3,833,532 A * | 9/1974 | Bennett .................... C08F 36/04 524/836 |
| 4,075,173 A | 2/1978 | Maruyama et al. |
| 4,156,069 A | 5/1979 | Prevorsek et al. |
| 4,176,224 A | 11/1979 | Bier et al. |
| 4,224,419 A | 9/1980 | Swoboda et al. |
| 4,269,964 A | 5/1981 | Freitag et al. |
| 4,311,823 A | 1/1982 | Imai et al. |
| 4,334,053 A | 6/1982 | Freitag et al. |
| 4,584,360 A | 4/1986 | Paul et al. |
| 4,605,699 A | 8/1986 | Mitulla et al. |
| 4,880,875 A | 11/1989 | Wassmuth et al. |
| 4,982,014 A | 1/1991 | Freitag et al. |
| 6,187,825 B1 | 2/2001 | Guntherberg et al. |
| 6,525,172 B1 | 2/2003 | Barghoorn et al. |
| 2003/0181583 A1 | 9/2003 | Duijzings et al. |
| 2004/0132905 A1 | 7/2004 | Eichenauer et al. |
| 2010/0144938 A1 | 6/2010 | Seidel et al. |
| 2013/0281595 A1 | 10/2013 | Seidel et al. |
| 2015/0065623 A1 | 3/2015 | Seidel et al. |
| 2015/0361225 A1 | 12/2015 | Thiem et al. |
| 2016/0075813 A1 | 3/2016 | Niessner et al. |
| 2016/0083572 A1 | 3/2016 | Niessner et al. |
| 2016/0297957 A1 | 10/2016 | Boeckmann et al. |
| 2017/0145201 A1 | 5/2017 | Boeckmann et al. |
| 2018/0179315 A1 | 6/2018 | Walker et al. |
| 2018/0355160 A1 | 12/2018 | Michels et al. |
| 2020/0181336 A1* | 6/2020 | Rohrbach ................. C08F 6/22 |
| 2022/0064414 A1* | 3/2022 | Inoue ...................... C08L 23/06 |

FOREIGN PATENT DOCUMENTS

| | | |
|---|---|---|
| CA | 1173998 A | 9/1984 |
| DE | 1900270 A1 | 11/1969 |
| DE | 1495626 B1 | 6/1970 |
| DE | 2232877 A1 | 1/1974 |
| DE | 2703376 A1 | 8/1977 |

(Continued)

OTHER PUBLICATIONS

Zhou, Effects of Phosphate Salts on the pH Values and Rapid Visco Analyser (RVA) Pasting Parameters of Wheat Flour Suspensions; Ceeral Chern vol. 89 No. 1 (2012) pp. 38-43. (Year: 2012).*

(Continued)

*Primary Examiner* — David J Buttner
(74) *Attorney, Agent, or Firm* — Raphael Bellum PLLC

(57) ABSTRACT

The present invention relates to a process for producing a thermoplastic molding composition and articles made thereof having improved surface quality, in particular improved surface quality after exposure to warm-humid environmental conditions. The thermoplastic molding composition comprises a thermoplastic polymer A, a graft copolymer B obtained by emulsion graft polymerization and optionally a further polymer component P, as well as optional further components/additives K, wherein at least one crystallization additive C, selected from phosphate compounds having 1 to 25 phosphate units, organic acids and salts thereof, is added during or after the preparation of the graft copolymer B.

14 Claims, No Drawings

(56) References Cited

FOREIGN PATENT DOCUMENTS

| | | | |
|---|---|---|---|
| DE | 2714544 | A1 | 10/1977 |
| DE | 2715932 | A1 | 10/1978 |
| DE | 2826925 | A1 | 1/1980 |
| DE | 2842005 | A1 | 4/1980 |
| DE | 3000610 | A1 | 7/1980 |
| DE | 2940024 | A1 | 4/1981 |
| DE | 3007934 | A1 | 9/1981 |
| DE | 3334782 | A1 | 10/1984 |
| DE | 3414118 | A1 | 10/1985 |
| DE | 3615607 | A1 | 11/1987 |
| DE | 3832396 | A1 | 2/1990 |
| DE | 10353952 | A1 | 6/2005 |
| DE | 102005022632 | A1 | 11/2006 |
| EP | 3022200 | A1 | 1/1981 |
| EP | 3111260 | A1 | 6/1984 |
| JP | 2010150301 | * | 7/2010 |
| JP | 2010150301 | A | 7/2010 |
| WO | 3909797 | A1 | 10/1989 |
| WO | 9828344 | A1 | 7/1998 |
| WO | 9049053 | A1 | 8/2000 |
| WO | 200210222 | A1 | 2/2002 |
| WO | 2008020012 | A2 | 2/2008 |
| WO | 2010063381 | A1 | 6/2010 |
| WO | 2012022710 | A1 | 2/2012 |
| WO | 2013160029 | A1 | 10/2013 |
| WO | 2013160249 | A1 | 10/2013 |
| WO | 2014170406 | A1 | 10/2014 |
| WO | 2014170407 | A1 | 10/2014 |
| WO | 2015078751 | A1 | 6/2015 |
| WO | 2015150223 | A1 | 10/2015 |
| WO | 2015165810 | A1 | 11/2015 |
| WO | 2017093468 | A1 | 6/2017 |

OTHER PUBLICATIONS

International Preliminary Report on Patentability in International Application No. PCT/EP2018/080907, dated Oct. 23, 2019.

* cited by examiner

THERMOPLASTIC MOLDING COMPOSITION AND ARTICLES MADE THEREOF HAVING IMPROVED SURFACE QUALITY

The present invention relates to a process for producing a thermoplastic molding composition and articles made thereof having improved surface quality, in particular improved surface quality after exposure to warm-humid environmental conditions. The thermoplastic molding composition comprises a thermoplastic polymer A, a graft copolymer B obtained by emulsion graft polymerization and optionally a further polymer component P, as well as optional further components/additives K, wherein at least one crystallization additive C, selected from phosphate compounds having 1 to 25 phosphate units, organic acids and salts thereof, is added during or after the preparation of the graft copolymer B.

Emulsion polymerization technique for production of polymer dispersions, so called emulsion rubbers or polymer latices, is widely known in the art. Polymer latices, which are obtained by emulsion polymerization, are used for a wide variety of applications, such as emulsion paints, paper coatings, leather finishing, textile finishing, raw materials for adhesives. Generally, in emulsion polymerization the polymerization takes places in monomer droplets (dispersed phase of the emulsion), which are dispersed in an aqueous medium (continuous phase of the emulsion). Typically, the polymerization is initiated by an water-soluble radical initiator. Typically, the emulsion is stabilized by the addition of one or more surfactants.

Furthermore, it is known to use graft rubber components, which are composed of one or more graft bases and one or more graft shells and which are produced by emulsion polymerization, for impact modified thermoplastic resins. Typically, solid graft copolymers, which need to be isolated from the aqueous phase after graft emulsion polymerization, are incorporated into thermoplastic molding compositions in order to improve the impact strength of the thermoplastic resin. For example it is known to incorporate graft copolymer rubbers, e.g. grafted crosslinked polyalkyl(meth)acrylate rubbers or grafted polybutadiene rubbers, into styrene polymers or copolymers, such as styrene-acrylonitrile copolymers (SAN) or methylstyrene-acrylonitrile copolymers, in order to improve the impact strength of the styrene polymer or copolymer. Such acrylonitrile-butadiene-styrene copolymers (ABS) and acrylonitrile-styrene-acrylate copolymers (ASA) have been used for many years for the production of various moldings, which can be used in many application, e.g. for the automotive or electronic sector.

Generally, such impact modified SAN moldings can be produced by emulsion polymerization of styrene and acrylonitrile (SAN matrix) in the presence of the graft copolymer latex or by mixing (e.g. by extrusion) the graft copolymer, which is prepared as latex and isolated separately, and the thermoplastic SAN matrix.

Typically, impact modified thermoplastic resins, such as ABS and ASA, exhibit particularly advantageous mechanical properties, such as high strength (impact strength, notched impact strength), high stiffness (E modulus), good processability (thermoplastic melt flow, MVR) and high heat resistance. Furthermore, the surface properties, such as gloss, smoothness, homogeneity of the surface, are of particular importance for moldings produced from such impact modified resins.

Often impact modified molding compositions including a graft copolymer and articles made thereof comprise salt inclusions, which typically result from the acid and/or salt solution used for precipitation of the graft copolymer after its emulsion polymerization. Typically, alkaline metal salts, alkaline earth metal salts and aluminum salts, such as including chlorine, sulfate, nitrate, phosphate, acetate, formate, aluminates and carbonates, are used for precipitation of graft copolymer latices. In particular, the salt inclusions comprise one or more salts mentioned above having a low solubility, e.g. magnesium sulfate.

Especially, high amount of salt can lead to formation of relatively large salt particles and inclusions, wherein the salt inclusions may be formed by single crystals, inter-grown/fused crystals, amorphous or microcrystalline particles or conglomerates thereof. These salt inclusions often lead to surface defects, such as white spots, cavities, and/or cracks, and reduced surface quality of the molded or extruded articles, especially after exposure to humidity. When exposed to humidity typically the salt inclusions absorb water, swells, and may result in white spots or may be dissolved leaving a cavity or may crack the surface leading to a crack. Often the resulting surface defect is even larger than the original salt inclusion.

Thus, the salt inclusions in resin compositions including a graft copolymer impair the surface quality significantly, and need to be avoided, especially for high gloss surfaces. Moreover, salt inclusions may affect mechanical properties negatively, e.g. impact strength can be reduced if a salt particle acts as a nucleus of a fissure. In particular large salt particles in the material cause less constant mechanical properties.

In this context, it is of particular importance to retain the surface quality of the molding compositions and/or molded parts, when the compositions and/or parts are exposed to warm-humid environmental conditions.

Generally warm and humid environmental conditions mean conditions encompassing a temperature and humidity which are above the common environmental conditions of 15 to 25° C. and relative humidity of 30 to 60%. Further, warm-humid environmental conditions often encompass the direct contact with liquid water.

The precipitation of graft copolymer latices using salts solution, which particularly includes di and/or trivalent metal ions, is known for decades and a standard procedure in many industrial processes. Often washing and/or purification steps are utilized after precipitation of the graft polymers in order to reduce the salt content. Such additional washing step is laborious, costly and environmental unfriendly, because it needs high amounts of energy and water and produces wastewater.

Alternative methods for the precipitation of graft polymer latices without salt are precipitation with acid, or precipitation by physical means, such as strong shear (for example using a rotor/stator device as described in WO 98/28344) or freezing (for example described in WO 89/09797). As a rule, the application of acid means necessity of extensive washing and/or neutralization of the acid afterwards. Otherwise, remaining acid may induce corrosion of process equipment in all later steps. Furthermore, often the acid may lead to degeneration of polymers used in blends, such as polycarbonate. In line with this, often the alkaline precipitation using a salt is the preferred option. Precipitation by physical means is more expensive because of extensive equipment and high energy consumption. Furthermore, completeness of precipitation is difficult to achieve and subsequent mechanical dewatering is less effective than for product precipitated by salt or acid.

The document DE-A 10 353 952 describes the precipitation of graft rubbers obtained by emulsion polymerization using alkali formate or earth alkali formate as precipitating agent. The surface quality of the graft rubbers and blends thereof was increased by this preparation process. Furthermore, it is described that the use of formate instead of sulfate leads to fewer large salt particles. This effect should be demonstrated by pressure increase during melt filtration of final product. Generally, formate salts are more expensive than other salts used for precipitation, furthermore, the effect is not strong enough to fully satisfy.

The document WO 2013/160029 describes a polymer composition, in particular ABS compositions, having good surface quality also after storage under warm-humid environmental conditions. The polymer compositions comprise a graft polymer, prepared by emulsion polymerization and subsequent precipitation in alkaline medium by addition of an alkaline earth metal salt, wherein the molar ratio Na/(Mg+Ca) in the precipitation medium is adjusted between 0.1 and 1.0.

For extrusion processes, the polymer melt is often filtered. Nevertheless, usually the melt filters are too coarse to remove smaller salt particles, which still lead to visible defects after warm-humid storage. Finer filters are technically difficult due to pressure built-up and often not economical because of additional investment and frequent filter changes. The document WO 2013/160249 describes a polymer composition, in particular an ABS composition, with good surface also after warm and humid storage. Keeping the material free of large salt particles is achieved by filtering the polymer melt using a sieve having a size of not larger than 60 μm.

In WO 2013/160029 it is furthermore proposed to use very strong shear forces to the polymer melt in order to destroy the salt particles. However, the application of strong shear forces may result in polymer degradation, following the melt flow properties and mechanical properties might be affected adversely and the amount of residual monomer may increase.

The document WO 2010/063381 describes compositions of polycarbonate and graft polymer obtained by emulsion polymerization under addition of acidic phosphorus compound, wherein the compositions should exhibit improved hydrolysis stability and thermal stability. According to WO 2010/063381 the acidic phosphorus compound is mixed with the polycarbonate, the graft polymer and further components via conventional melt compounding.

The document WO 00/49053 describes a method for drying coagulated water containing rubber particles, wherein said particles are treated with an aqueous monodisperse solution of salts, alcohols, acids and sugars. The inner content of water between the particles should be reduced.

Further, the document WO 2017/093468 describes thermoplastic molding compositions based on ABS having improved surface quality, in particularly after storage in warm and humid environment, wherein the precipitated ABS graft latex is dried in a fluid bed dryer and/or a flash dryer. In particular small salt particles, which are not visual by human eye, should be obtained using a specific drying method.

Thus, there is still a high need to provide an improved process for producing graft copolymer latices leading to reduced salt inclusions, wherein time, energy and cost consuming additional steps are avoided.

Surprisingly, it was found that the surface quality of ABS or ASA molding compositions and similar molding compositions comprising a graft copolymer, which is produced in water and precipitated with a precipitation solution comprising at least one multivalent cation, can be increased significantly by addition of selected phosphate compounds and/or addition of organic acids or their salts (crystallization additive C). In particular it has been found, that the selected additive (crystallization additive C) can influence the formation, e.g. the crystallization, of the salt particles, such as magnesium sulfate, in the preparation of graft copolymer. For example, it seems that the selected crystallization additive C can influence the crystallization of salt resulting in smaller salt inclusions, preferably salt inclusions which are not visual by human eye without tools and also do not lead to defects visible to the human eye without tools. In line with this, the specific additive C can reduce the amount of large salt inclusions in graft copolymer products.

Furthermore, it was surprisingly found that the specific additive C can be added before or in parallel to the precipitation solution comprising at least one multivalent cation, without affecting the precipitation of the polymer latex adversely. Thus, it can be assumed that the inventive effect does not originate from a complexation of the precipitation agent, in particular the multivalent cation.

Especially this improved surface quality can be observed after warm-humid storage. This means the number of surface defects after warm-humid storage is significantly reduced. Further, the surface quality of blends with other thermoplastic polymers, such as polycarbonates, can be improved significantly. These additives for better surface quality, crystallization additives C, are described further below.

It was found that a specific amount of the selected crystallization additive C is particularly preferred, which is in the range of 0.005 to 1.6% by weight, based on the solid content of the at least one graft copolymer B. It was surprisingly found, that higher amounts of the selected additives C impair the surface quality of the graft copolymer after warm-humid storage.

As an additional advantageous effect, the thermal stability of the graft copolymer (e.g. evaluated in Scorch test) was increased by addition of crystallization additive C selected from phosphate compounds, wherein this additional effect can be obtained even by small amounts of selected phosphate compounds.

The present invention is directed to a process for the preparation of a thermoplastic molding composition comprising:

A: 5 to 95% by weight, preferably 40 to 90% by weight, more preferably 50 to 90% by weight, based on the total molding composition, at least on thermoplastic polymer A, which comprises at least one vinylaromatic monomer A1 and optionally at least one further ethylenically unsaturated monomer A2;

B: 5 to 95% by weight, preferably 10 to 60% by weight, more preferably 10 to 50% by weight, based on the total molding composition, at least one graft copolymer B comprising:

B1: 5 to 95% by weight, preferably 50 to 90% by weight, also preferably 55 to 90% by weight, more preferably 55 to 65% by weight, based on the graft copolymer B, at least one graft base B1, obtained by emulsion polymerization of:

B11: 70 to 100% by weight, preferably 70 to 99.9% by weight, based on the graft base B1, at least one ethylenically unsaturated monomer B11, preferably selected from $C_1$-$C_8$ alkyl(meth)acrylate and diene monomers;

B12: 0 to 10% by weight, preferably 0.1 to 10% by weight, based on the graft base B1, at least on polyfunctional cross-linking monomer B12 different from B11;

B13 0 to 30% by weight, preferably 0 to 29.9% by weight, based on the graft base B1, at least one further copolymerizable monoethylenically unsaturated monomer B13 different from B11 and B12, preferably selected from styrene, α(alpha)-methylstyrene, $C_1$-$C_4$-alkylstyrene, acrylonitrile, methacrylonitrile, isoprene, butadiene, chloroprene, methylmethacrylate, alkylenglycole-di(meth)acrylate, and vinylmethylether, and optional addition of B14: 0 to 5% by weight, preferably 0.01 to 5% by weight, based on the graft base B1, of at least one agglomerating component B14, wherein the sum of B11, B12, B13 and B14 is 100% by weight; and B2: 5 to 95% by weight, preferably 10 to 50% by weight, also preferably 10 to 45% by weight, more preferably 35 to 45% by weight, based on the graft copolymer B, at least one graft shell B2, which is obtained by emulsion polymerization in the presence of the at least one graft base B1 of:

B21 50 to 100% by weight, preferably 50 to 95% by weight, more preferably 65 to 80% by weight, also preferably 75 to 80% by weight, based on the graft shell B2, at least one vinylaromatic monomer B21, preferably selected from styrene, α(alpha)-methylstyrene or mixtures of styrene and at least one further monomer selected from α(alpha)-methylstyrene, p(para)-methylstyrene and $C_1$-$C_8$ alkyl(meth)acrylate, and B22 0 to 50% by weight, preferably 5 to 50% by weight, more preferably 20 to 35% by weight, also preferably 20 to 25% by weight, based on the graft shell B2, at least one ethylenically unsaturated monomer B22, preferably selected from acrylonitrile and mixtures of acrylonitrile and at least one further monomer selected from methacrylonitrile, acrylamide, vinyl-methyl ether, anhydrides of unsaturated carboxylic acids and imides of unsaturated carboxylic acids;

wherein the total sum of graft base B1 and graft shell B2 is 100% by weight;

P: 0 to 90% by weight, based on the total molding composition, at least one further polymer component P; and K: 0 to 40% by weight, based on the total molding composition, at least one additive K;

wherein the process encompasses the steps:

a) preparation of the at least one graft base B1 via emulsion polymerization of the at least one monomer B11, and optional B12 and/or B13, and optional addition of the at least one agglomerating component B14;

b) preparation of the at least one graft copolymer B (in form of graft copolymer B latex) via emulsion polymerization of the at least one monomer B21 and optional B22 in the presence of the at least one graft base B1;

c) precipitation of the graft copolymer B by mixing the graft copolymer B latex obtained in step b) with a precipitation solution S comprising at least one multivalent cation, preferably selected from divalent and trivalent cations, more preferably selected from alkaline earth metal cations and aluminum cations;

d) addition of at least one crystallization additive C selected from phosphate compounds having 1 to 25 phosphate units, organic acids and salts thereof, wherein the organic acids have at least two functional groups selected from acidic groups, preferably carboxyl groups, and hydroxyl groups with the proviso that at least one functional group is an acidic group, and wherein the organic acids encompass at most three carbon atoms per functional group, during and/or after any of steps a), b) and/or c), wherein the crystallization additive C is added in an amount of 0.005 to 1.6% by weight, preferably of 0.01 to 1.2% by weight, more preferably 0.02 to 0.5% by weight, also preferably 0.3 to 1.2% by weight, also preferably 0.4 to 1% by weight, based on the solid content of the at least one graft copolymer B;

e) mechanical dewatering, optional washing and/or optional drying of the precipitated graft copolymer B obtained in step d);

f) mixing of the precipitated graft copolymer B obtained in step e) with component A and optional the components P and/or K, wherein the thermoplastic molding composition is obtained.

In a preferred embodiment the amounts of the components A and B are summed up to 100% by weight. In a further preferred embodiment the amounts of the components A and B and optional components P and K are summed up to 100% by weight. In particular the minimum and/or maximum amount of the thermoplastic polymer A can be adapted so that the sum of the compounds results in 100% by weight.

Thermoplastic Polymer A

Preferably the thermoplastic polymer A is free of any latex type polymer (rubber free) and comprises at least 30% by weight of one or more vinyl aromatic monomer(s) A1, preferably selected from styrene, α-methylstyrene, and mixtures of styrene with other co-monomers. In particular the at least one thermoplastic polymer A, can be selected from polystyrene, copolymers of styrene, e.g. styrene-acrylonitrile copolymers, copolymers of α-methyl styrene, e.g. α-methylstyrene-acrylonitrile copolymers, polycarbonates, polyamides, and polyesters. Typically, the at least one thermoplastic polymer A forms the matrix of the thermoplastic molding composition.

Preferably, the at least one thermoplastic polymer A comprises (preferably consists of) 60 to 74% by weight of one or more vinyl aromatic monomer(s) A1, selected from styrene, α-methylstyrene, and mixtures of styrene with other co-monomers, most preferably solely styrene; and 26 to 40% by weight of at least one at least one further ethylenically unsaturated monomer A2, selected from vinyl cyanide monomers, preferably selected from acrylonitrile and mixtures of acrylonitrile and at least one further monomer selected from methacrylonitrile, acrylamide, vinylmethyl ether, anhydrides of unsaturated carboxylic acids (e.g. maleic anhydride or phthalic acid anhydride) and imides of unsaturated carboxylic acids (e.g. N-substituted maleimides, like N-cyclohexylmaleimide or N-phenylmaleimide).

In a preferred embodiment the thermoplastic polymer A is composed of the monomers A1 and A2, wherein the at least one vinyl aromatic monomer A1 is selected from styrene, α-methylstyrene, and mixtures thereof; and the at least one vinyl cyanide monomer A2 is acrylonitrile.

Preferably the thermoplastic polymer A comprises (preferably consists of):

A1: 60 to 90% by weight, preferably 69 to 81% by weight, preferably 70 to 76% by weight, more preferably 72 to 76% by weight, based on A, at least one vinyl aromatic monomer A1, selected from styrene, α(alpha)-methylstyrene and para-methylstyrene, and A2: 10 to 40% by weight, preferably 19 to 31% by weight, preferably 24 to 30% by weight, more preferably 24 to 28% by weight, based on A, at least one vinyl cyanide monomer as monomer A2, preferably selected from acrylonitrile and/or methacrylonitrile.

In a preferred embodiment, the at least one the thermoplastic polymer A is selected from:

A-I at least one styrene-acrylonitrile copolymer, produced from 64 to 81% by weight, based on A-I, of styrene as monomer A1 and 19 to 36% by weight, based on A-I, of acrylonitrile as monomer A2, A-II at least one α(alpha)-methylstyrene-acrylonitrile copolymer, produced from 69 to 80% by weight, based on A-II, of α(alpha)-methylstyrene, and 20 to 31% by weight, based on A-II, of acrylonitrile, or A-III a mixture of thermoplastic polymer A-I and A-II, wherein the sum being 100%.

In particular, the at least one thermoplastic polymer A may be obtained by copolymerization of acrylonitrile, styrene and α-methylstyrene.

The at least one thermoplastic polymer A can be prepared by all known methods, for example bulk polymerization, solution polymerization, suspension polymerization and emulsion polymerization or mixed processes, e.g. mass/suspension polymerizations, with or without further components. More preferably the at least one thermoplastic polymer A is prepared via bulk polymerization or in the presence of one or more solvents, for example, toluene or ethylbenzene. A polymerization process is for example described in Kunststoff-Handbuch [Plastics Handbook], Vieweg-Daumiller, volume V, (Polystyrol) [Polystyrene], Carl-Hanser-Verlag, Munich 1969, pages 122 et seq. Further, the at least one thermoplastic polymer A may be a mixture of polymers which may have been produced with different methods.

Preference is given to thermoplastic polymer A having weight-average molar masses $M_w$ of from 50,000 to 300,000 g/mol (determined by means of GPC, eluent THF, as PS equivalents). The viscosity (Vz) of the thermoplastic polymer A may be for example in the range of 50 to 120 ml/g (measured to DIN 53726 at 25° C. in a 0.5% strength by weight solution in DMF).

Graft Copolymer B

The inventive thermoplastic molding composition comprises 5 to 95% by weight, preferably 10 to 60% by weight, more preferably 10 to 50% by weight, based on the total molding composition, of at least one graft copolymer B, which is obtained by emulsion polymerization.

In terms of the present invention, the term emulsion polymerization also includes commonly known polymerization methods, where polymer is produced in droplets surrounded by water; for example emulsion polymerization, micro-suspension polymerization, and suspension polymerization. Preferably, the term emulsion polymerization is directed to polymerization methods, wherein the polymer is produced in the monomer droplets of an aqueous emulsion of monomer droplets, wherein at least one surfactant is present in an amount above the critical micelle concentration and the polymerization is initiated by at least one aqueous soluble initiator.

Often the graft copolymer B has a complex structure and is in essence composed of one or more graft base(s) B1 and one or more graft shell(s) B2. Typically, the graft copolymer B is produced in form of a latex (rubber) by emulsion polymerization in steps a) and b), wherein firstly one or more graft base(s) B1 are obtained by emulsion polymerization of the monomers B11 and optionally B12 and B13 as described and afterwards one or more graft shell(s) B2 are obtained by graft emulsion polymerization of the monomers B21 and B22 as described in the presence of one or more of the graft base B1. Furthermore, mixtures of two or more graft copolymers B, which differ in their structure, can be used according to the invention.

Preferably, the graft copolymer B latex is polymerized by aqueous free-radical emulsion polymerization. The polymerization reaction is typically initiated via water-soluble or oil-soluble free-radical polymerization initiators, e.g. inorganic or organic peroxides, such as peroxodisulfate or benzoyl peroxide, or with the aid of redox initiator systems. The documents WO 2002/10222, DE-A 28 26 925, and also EP-A 022 200 describe suitable polymerization processes.

Typically the graft copolymer B (obtained as latex) has an average particle diameter (weight mean particle size $D_{50}$) of 50 to 1000 nm, preferred 90 to 700 nm. The particle size of latex particles can be governed during synthesis by suitable means known in the literature, e.g. DE-A 28 26 925.

Typically the particle diameter $D_{50}$ can be measured by ultracentrifugation (e.g. described in W. Scholtan, H. Lange, Kolloid-Z. u. Z. Polymere 250, S. 782 bis 796, 1972) or using Hydrodynamic Chromatography HDC (e.g. described in W. Wohlleben, H. Schuch, "Measurement of Particle Size Distribution of Polymer Latexes", 2010, Editors: L. Gugliotta, J. Vega, p. 130-153). The mean particle diameter $D_{50}$ represents the value of the particle size distribution curve where 50 Vol.-% of the particles (e.g. latex particles) have a smaller diameter and the other 50 Vol.-% have a larger diameter, compared to the $D_{50}$ value. In similar way for example the $D_{90}$ values gives the particle diameter, where 90 Vol.-% of all particles have a smaller diameter. The mean particle size can be also determined by turbidity measurement as described in Lange, Kolloid-Zeitschrift and Zeitschrift für Polymere, Band 223, Heft 1. Generally, the broadness U of particle size distribution is defined by: $U=(D_{90}-D_{10})/D_{50}$.

Preferably the graft copolymer B comprises at least one graft shell B2, which is obtained by emulsion polymerization in the presence of the at least one graft base B1 of:

B21 50 to 95% by weight, more preferably 65 to 80% by weight, also preferably 75 to 80% by weight, based on the graft shell B2, at least one vinylaromatic monomer B21, selected from styrene, α(alpha)-methylstyrene or mixtures of styrene and at least one further monomer selected from α(alpha)-methylstyrene, p(para)-methylstyrene and $C_1$-$C_8$ alkyl(meth)acrylate, preferably $C_1$-$C_4$ alkyl(meth)acrylate (e.g. methyl methacrylate or ethyl methacrylate), and B22 5 to 50% by weight, more preferably 20 to 35% by weight, also preferably 20 to 25% by weight, based on the graft shell B2, at least one ethylenically unsaturated monomer B22, selected from acrylonitrile or mixtures of acrylonitrile and at least one further monomer selected from methacrylonitrile, acrylamide, vinylmethyl ether, anhydrides of unsaturated carboxylic acids (e.g. maleic anhydride or phthalic acid anhydride) and imides of unsaturated carboxylic acids (e.g. N-substituted maleimides, like N-cyclohexylmaleimide or N-phenylmaleimide);

wherein the total sum of graft base B1 and graft shell B2 is 100% by weight.

More preferably the monomer B21 is styrene or α(alpha)-methylstyrene and the monomer B22 is acrylonitrile.

Furthermore graft copolymers B having two or more different graft shells B2 can be used. Graft copolymers with multi-layer graft shells are for example described in EP-A 0 111 260 and WO 2015/078751.

In a preferred embodiment the thermoplastic molding composition comprises at least one diene based graft copolymer as component B. In this preferred embodiment, for example the at least graft copolymer B comprises (preferably consisting of):

B1: 5 to 95% by weight, preferably 40 to 85% by weight, based on the graft copolymer B, of at least one graft base B1, which is obtained by emulsion polymerization of:

B11: 50 to 100% by weight, preferably 60 to 100% by weight, more preferably 80 to 100% by weight, based on the graft base B1, butadiene and/or isoprene, preferably butadiene, as monomer B11;

B13: 0 to 50% by weight, preferably 0 to 40% by weight, more preferably 0 to 20% by weight, based on the graft base B1, at least one further monomer B13 selected from styrene, α-methylstyrene, acrylonitrile; methacrylonitrile, isoprene, chloroprene, $C_1$-$C_4$ alkyl styrene, (meth)acrylic acid $C_1$-$C_8$-alkyl esters, alkylenglykol-di(meth)acrylate and divinylbenzene, preferably styrene, for example 0.1 to 20% by weight, based on B1, of styrene;

wherein the sum of B11+B13 is 100% by weight; and

B2: 5 to 95% by weight, preferably 15 to 60% by weight, based on the graft copolymer B, of at least one graft shell B2, which is obtained by emulsion polymerization in the presence of the at least one graft base B1 of:

B21 50 to 95% by weight, based on the graft shell B2, of a monomer B21, selected from styrene, α-methylstyrene, and mixtures of styrene and at least one more monomer selected from α-methylstyrene, p-methylstyrene and (meth)acrylic acid $C_1$-$C_8$-alkyl esters;

B22 5 to 50% by weight, based on the graft shell B2, of a monomer B22, selected from acrylonitrile and mixtures of acrylonitrile and at least one more monomer selected from methacrylonitrile, anhydrides of unsaturated carbon acids (e.g. maleic anhydride, phthalic anhydride) and imides of unsaturated carbon acids (e.g. N-substituted maleimide, such as N-cyclohexyl maleimide and N-phenyl maleimide);

wherein the sum of graft base B1 and graft shell B2 is 100% by weight.

In a preferred embodiment the graft copolymer B is an ABS graft copolymer composed of a graft base B1, obtained by emulsion polymerization of monomer B11, which is butadiene, and monomer B13, which is styrene, and a graft shell B2, which is obtained by emulsion polymerization of monomer B21, selected from styrene, α-methylstyrene and mixtures thereof, and the monomer B22, which is acrylonitrile, in the presence of the graft base B1.

Preference is also given to a diene based graft base B1a, which is obtained by an emulsion polymerization process of butadiene and styrene in a ratio from 98:2 to 95:15 according to WO 2014/170407, wherein the styrene is fed at the beginning of the polymerization. Generally, such graft base B1a has a $D_{50}$ value in the range from 70 to 120 nm, particularly preferably from 70 to 110 nm. Typically, the polydispersity U ($U=(D_{90}-D_{10})/D_{50}$) of such graft base B1a is less than 0.35, preferably less than 0.33.

Preference is also given to a diene based graft base B1b, which is obtained by an emulsion polymerization process of butadiene and styrene in a ratio from 95:5 to 80:20 according to WO 2012/022710, wherein the emulsion polymerization is carried out in the presence of at least one resin acid-based emulsifier and at least one alkali persulfate initiator. Typically, such graft base B1b has a weight average particle diameter $D_w$ of equal to or less than 120 nm and the following relation is met for such graft base B1b: W*(1−1.4*S)*DW is less than 2.3 or more than 6.0, and wherein W denotes the amount, in parts per one hundred parts by weight (pphr) of latex solids, of decomposed alkali persulfate, S is the amount of the optional salt (in weight-% based on latex solids).

Preferably the graft base B1, having a multi- or bimodal, more preferably a bimodal, particle size distribution. Preferably, a bimodal particle size distribution is obtained by agglomerating the graft base B1 after its emulsion polymerization, using at least one agglomerating component B14, in particular a agglomerating copolymer, in particular an agglomerating latex, as described in WO 2008/020012, wherein the graft shell B2 is obtained by emulsion polymerization of the monomers B21 and B22 in the presence of the agglomerated graft base B1.

In a preferred embodiment the graft copolymer B comprises (preferably consisting of):

B1: 40 to 85% by weight, based on the graft copolymer B, of at least one graft base B1, which is obtained by emulsion polymerization of:

B11: 79 to 100% by weight, based on the graft base B1, butadiene;

B13: 0 to 21% by weight, based on the graft base B1, at least one further monomer B13 selected from styrene, α-methylstyrene, acrylonitrile; methacrylonitrile, isoprene, chloroprene, $C_1$-$C_4$ alkyl styrene, (meth)acrylic acid $C_1$-$C_8$-alkyl esters, alkylenglykol-di(meth)acrylate and divinylbenzene;

wherein the sum of B11+B13 is 100% by weight;

and agglomerating the obtained graft base B1 by adding

B14: 0.01 to 5% by weight, based on the graft base B1, in each case based on the solids content, of an agglomerating copolymer as agglomerating component B14 composed of:

B14a: 80 to 99.9% by weight, based on B14, of one or more hydrophobic $C_1$-$C_{12}$ alkyl acrylates or $C_1$ to $C_{12}$ alkyl methacrylates, preferably ethyl acrylate, and B14b: 0.1 to 20% by weight, based on B14, of one or more hydrophilic co-monomers selected from the group consisting of methacrylamide, acrylamide, methylacrylamide, ethylacrylamide and n-butylacrylamide, preferably methacrylamide, where B14a and B14b sum to 100% by weight; and B2: 15 to 60% by weight, based on the graft copolymer B, of at least one graft shell B2, which is obtained by emulsion polymerization in the presence of the agglomerated graft base B1 of:

B21 70 to 90% by weight, based on the graft shell B2, of a monomer B21, selected from styrene, α-methylstyrene, and mixtures of styrene and at least one more monomer selected from α-methylstyrene, p-methylstyrene and (meth)acrylic acid $C_1$-$C_8$-alkyl esters;

B22 10 to 30% by weight, based on the graft shell B2, of a monomer B22, selected from acrylonitrile and mixtures of acrylonitrile and at least one more monomer selected from methacrylonitrile, anhydrides of unsaturated carbon acids (e.g. maleic anhydride, phthalic anhydride) and imides of unsaturated carbon acids (e.g. N-substituted maleimide, such as N-cyclohexyl maleimide and N-phenyl maleimide); wherein the sum of graft base B1 and graft shell B2 is 100% by weight.

The agglomerating copolymer used as agglomerating component B14 is preferably employed as an aqueous dispersion, in particular in form of an aqueous polymer latex.

In particular the agglomerating copolymer used as agglomerating component B14 has a $D_{50}$ value of 110 to 140 nm, especially from 115 to 140 nm, and very particularly preferably from 120 to 135 nm. The particles size distribution of the agglomerating copolymer (B14) can have different values of polydispersity U. In one embodiment the, the particles size distribution of the agglomerating copolymer (B14) can be relatively broad with values of polydispersity U larger than 0.27. In another embodiment the particles size distribution of the agglomerating copolymer (B14) has a polydispersity U of 0.27 or less, preferably of 0.25 or less, also preferably of 0.23 or less. The above mentioned embodiments may be combined with one another.

Typically, the agglomerating copolymer used as agglomerating component B14 is applied in an amount of 0.1 to 6% by weight, preferred 1 to 4.5% by weight, more preferred 2.4 to 3.5% by weight (based on solids B14 to solids of graft base B1).

Furthermore, it is possible to agglomerate graft base B1 by addition of another substance B14 which induces agglomeration. For example the agglomerating component B14 may be selected from Brönsted acids or a substance, which forms an acid after it is applied, e.g. an anhydride which hydrolyzes towards an acid or a mixture thereof.

Acid anhydride, e.g. acetic acid anhydride, is preferred. The agglomerating component B14 is typically applied in an amount of 0.1 to 5%, preferably 0.5 to 2%, based on graft base B1 (referring to solids of B1). Alternatively, graft base B1 may be agglomerated by shear force, e.g., by pressing graft base B1 latex A through a nozzle, wherein generally very broad particle size distributions are achieved.

The particle size distribution of the graft copolymer B can be mono-, bi-, or poly-modal. According to one particularly preferred embodiment of the invention, the particle size distribution is bimodal.

In a preferred embodiment the agglomerated graft base B1 has a monomodal distribution and an mean particle diameter $D_{50}$ of 150 to 550 nm, preferably of 200 to 450 nm, and particularly preferably of 250 to 400 nm.

In a preferred embodiment the agglomerated graft base B1 has a bimodal particle size distribution including a fraction of particles having a $D_{50}$ value in the range from 150 to 400 nm, preferably from 150 to 350 nm and particularly preferably from 150 to 300 nm, and a fraction of particles having a $D_{50}$ value in the range of from 425 to 700 nm, preferably from 450 to 650 nm and particularly preferably from 450 to 600 nm.

In a preferred embodiment the agglomerated graft base B1 has a bimodal particle size distribution after addition of the agglomerating copolymer used as agglomerating component B14, wherein the bimodal particle size distribution includes 10 to 40% by weight (based on the total weight of component B1) of a fraction x of particles having a particle size $D_{50}$ of not more than 150 nm, preferably in the range of from 80 to 120 nm, and 60 to 90% by weight of a fraction y of particles having a particle size $D_{50}$ in the range of from 330 to 450 nm, wherein the agglomerated graft base B1. Preferably, this agglomerated graft base B1 have a polydispersity U of less than 0.28 and preferably the fractions x and y summing up to 100% by weight.

Preferred embodiments of graft base B1 are also described in DE-A 10 2005 022632, examples $S_{11}$ to $S_{13}$, and WO 2014/170406, examples A1 to A3. In particular preferred embodiments of agglomerating copolymer used as agglomerating agent B14 are described in WO 2008/020012, examples 3.1a to 3.1h, and WO 2014/170406A1, examples C-1 and C-2. Preferably the graft copolymer B as described in WO 2014/170406, (see "Pfropfcopolymer B, Allgemeine Vorgehensweise", pp 34-35) is used according to the present invention.

The molding composition can also comprise two or more different graft copolymers B. In a preferred embodiment the graft copolymer B is a mixture of at least two graft copolymers B-I and B-II, wherein the graft copolymer B-I is obtained via emulsion polymerization of a mixture of the monomers B21 and B22 in the presence of a graft base B1-I, which has an particle diameter $D_{50}$ in the range of 80 to 330 nm, and graft copolymer B-II is obtained via emulsion polymerization of a mixture of the monomers B21 and B22 in the presence of a graft base B1-II, which has an particle diameter $D_{50}$ in the range of 340 to 480 nm.

Furthermore, preference is given to the following embodiments B-III and B-IV of graft copolymer B:

Preferred graft copolymer B-III comprises:

B1: 40 to 85% by weight, based on the graft copolymer B, at least one graft base B1, obtained by emulsion polymerization of:

B11: 79 to 100% by weight, based on the graft base B1, butadiene as ethylenically unsaturated monomer B11;

B13 0 to 21% by weight, preferably 0 to 29.9% by weight, based on the graft base B1, styrene as further copolymerizable monoethylenically unsaturated monomer B13:

and addition of

B14: 0.01 to 5% by weight, based on the graft base B1, at least one agglomerating latex as agglomerating component B14 composed of:

B14a: 80 to 99.9% by weight, based on B14, ethyl acrylate, and

B14b: 0.1 to 20% by weight, based on B14, of methylacrylamide, where B14a and B14b sum to 100% by weight;

and where B14 has a particle size $D_{50}$ in the range from 110 to 140 nm, preferably from 115 to 140 nm, and more preferably from 120 to 135 nm, and a polydispersity U larger than 0.27 and below 0.25, in particular below 0.23, and B2: 15 to 60% by weight, based on the graft copolymer B, one graft shell B2, which is obtained by emulsion polymerization in the presence of the at least one graft base B1 of:

B21 70 to 90% by weight, based on the graft shell B2, of styrene as vinylaromatic monomer B21; and B22 10 to 30% by weight, based on the graft shell B2, of acrylonitrile as ethylenically unsaturated monomer B22;

wherein the total sum of graft base B1 and graft shell B2 is 100% by weight;

wherein the agglomerated graft base B1 has a bimodal particle size distribution after addition of the agglomerating copolymer used as agglomerating component B14, wherein the bimodal particle size distribution includes 10 to 40% by weight (based on the total weight of particles of B1) of a fraction x of particles having a particle size $D_{50}$ of not more than 150 nm, preferably in the range of from 80 to 120 nm, and 60 to 90% by weight of a fraction y of particles having a particle size $D_{50}$ in the range of from 330 to 450 nm, wherein preferably the agglomerated graft base B1 has a polydispersity U of less than 0.28, and wherein preferably the fractions x and y summing up to 100% by weight;

and wherein the preparation of the graft copolymer B via emulsion polymerization in step b) is carried out at a temperature in the range of 50° C. to 90° C.

The preferred graft copolymer B-IV comprises:

B1: 45 to 85% by weight, preferably 45 to 75% by weight, based on the graft copolymer B, at least one graft base B1, obtained by emulsion polymerization of:
  B11: 78 to 98% by weight, preferably 85 to 97% by weight, based on the graft base B1, butadiene as ethylenically unsaturated monomer B11; and
  B13 2 to 20% by weight, preferably 3 to 15% by weight, based on the graft base B1, styrene as further copolymerizable monoethylenically unsaturated monomer B13;
  wherein the sum of B11 and B13 is 100% by weight; and B2: 15 to 55% by weight, preferably 25 to 55% by weight, based on the graft copolymer B, at least one graft shell B2, which is obtained by emulsion polymerization in the presence of the at least one graft base B1 of:
  B21: 65 to 80% by weight, preferably 65 to 75% by weight, based on the graft shell B2, of styrene as vinylaromatic monomer B21; and
  B22: 20 to 35% by weight, preferably 25 to 35% by weight, based on the graft shell B2, of acrylonitrile as ethylenically unsaturated monomer B22;
  wherein the total sum of graft base B1 and graft shell B2 is 100% by weight.

In a preferred embodiment the thermoplastic molding composition comprises at least one graft copolymer B, which is based on a crosslinked polyacrylate rubber as graft base B1, in particular the graft copolymer B can be an acrylonitrile-styrene-acrylate copolymer (ASA). In this preferred embodiment, for example the at least one graft copolymer B comprises (preferably consisting of):

B1: 50 to 90% by weight, preferably 55 to 90% by weight, more preferably 55 to 65% by weight, based on the graft copolymer B, at least one graft base B1 obtained by emulsion polymerization of:
  B11: 70 to 99.9% by weight, preferably 87 to 99.5% by weight, based on the graft base B1, at least one $C_1$-$C_8$ alkyl(meth)acrylate, preferably at least one $C_4$-$C_8$-alkyl(meth)acrylate, more preferably n-butylacrylate and/or 2-ethylhexylacrylate, also preferably solely n-butylacrylate, as monomer B11;
  B12: 0.1 to 10% by weight, preferably 0.5 to 5% by weight, also preferably 0.5 to 3% by weight, more preferably 1 to 2.5% by weight, based on the graft base B1, at least on polyfunctional, cross-linking monomer B12; preferably selected from allyl(meth) acrylate, divinylbenzene, diallylmaleate, diallylfumarate, diallylphthalate, triallylcyanurat, triallylisocyanurat and dicyclopentadienylacrylate (DCPA), more preferably allyl(meth)acrylate and/or dicyclopentadienylacrylate (DCPA);
  B13 0 to 29.9% by weight, preferably 0 to 20% by weight, more preferably 0 to 10% by weight, also preferably 0.5 to 10% by weight, based on the graft base B1, at least one further copolymerizable monoethylenically unsaturated monomer B13 different from B11 and B12, preferably selected from styrene, α(alpha)-methylstyrene, $C_1$-$C_4$-alkylstyrene, acrylonitrile, methacrylonitrile, isoprene, butadiene, chloroprene, methylmethacrylate, alkylenglycole-di(meth)acrylate, and vinylmethylether;
  wherein the sum of B11, B12 and optional B13 is 100% by weight (based on all monomers of graft base B1); and B2: 10 to 50% by weight, preferably 10 to 45% by weight, more preferably 35 to 45% by weight, based on the graft copolymer B, at least one graft shell B2, preferably one to three graft shells B2, wherein the at least one graft shell B2 is obtained by emulsion polymerization in the presence of the at least one graft base B1 of:
  B21: 50 to 95% by weight, preferably 65 to 80% by weight, more preferably 70 to 80% by weight, based on the graft shell B2, at least one monomer B21, selected from styrene, α(alpha)-methylstyrene or mixtures of styrene and one further monomer selected from α(alpha)-methylstyrene, p-methylstyrene, $C_1$-$C_4$-alkyl(meth)acrylate (e.g. methylmethacrylate, ethylmethacrylate), preferably selected from styrene, α(alpha)-methylstyrene or mixtures of styrene and α(alpha)-methylstyrene or methylmethacrylate; and
  B22: 5 to 50% by weight, preferred 20 to 35% by weight, more preferred 20 to 30% by weight, based on the graft shell B2, at least one ethylenically unsaturated monomer B22, selected from acrylonitrile or mixtures of acrylonitrile and at least one further monomer selected from methacrylonitril, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmalimide), preferably selected from acrylonitrile or mixtures of acrylonitrile and methacrylonitrile;
  wherein the total sum of graft base B1 and graft shell(s) B2 is 100% by weight.

More preferably the at least one graft base B1 is obtained by emulsion polymerization of:
  B11: 90 to 99.9% by weight, preferably 97 to 99.5% by weight, more preferably 97.5 to 99% by weight, based on the graft base B1, at least one monomer B11 selected from $C_1$-$C_8$ alkyl(meth)acrylate, preferable n-butylacrylate; and
  B12: 0.1 to 10% by weight, preferably 0.5 to 3% by weight, more preferably 1 to 2.5% by weight, based on the graft base B1, at least one polyfunctional, cross-linking monomer B12; selected from allyl(meth)acrylate, divinylbenzene, diallylmaleate, diallylfumarate, diallylphthalate and dicyclopentadienylacrylate (DCPA), especially from allyl(meth)acrylate and/or dicyclopentadienylacrylate (DCPA);
  wherein the sum of B11 and B12 is 100% by weight (based on all monomers of graft base B1).

Preferred monomers B11 for producing graft base B1 are alkylacrylates and/or alkyl-methacrylate (also referred to as alkyl(meth)acrylates) with 1 to 8, preferred 4 to 8, carbon atoms being present in the alkyl group. Especially preferred is n-butylacrylate and/or 2-ethylhexylacrylate, more preferred is n-butylacrylate alone or in mixture with other monomers B11. Preferred said alkyl(meth)acrylates are used alone as monomers B11.

In order to have cross-linking of the $C_1$-$C_8$-alkyl(meth)acrylate monomer B11 and therefore cross-linking of the graft base B1, monomers B11 are typically polymerized in presence of 0.1 to 10% by weight, preferred 0.1 to 5% by weight, preferred 0.5 to 3% by weight, preferred 1 to 4% by weight, more preferred 1 to 2.5% by weight, based on the graft base B1, one or more polyfunctional, cross-linking monomer(s) B12. Suitable monomers B12 are especially polyfunctional, cross-linking monomers, which can be copolymerized with the mentioned monomers, especially B11 and B13. Suitable polyfunctional, cross-linking monomers B12 comprise two or more, preferred two or three, more preferred exactly two ethylenic double bonds, which are preferably not 1,3-conjugated.

Examples for suitable polyfunctional, cross-linking monomers B12 are allyl(meth)acrylate, divinylbenzene, diallylester of carboxylic diacids, like e.g. diallymaleate, diallylfumarate and diallylphthalate. Especially, the polyfunctional, cross-linking monomer B12 is at least one monomer selected from allyl(meth)acrylate, divinylbenzene, diallymaleate, diallylfumarate, diallylphthalate, triallylcyanurate, triallylisocyanurate and dicyclopentadienylacrylate (DCPA), preferably from allyl(meth)acrylate, divinylbenzene, diallymaleate, diallylfumarate, diallylphthalate and dicyclopentadienylacrylate (DCPA), more preferably from ally(meth)acrylate and dicyclopentadienylacrylate (DCPA).

In a preferred embodiment 1 to 2.5% by weight, preferred 1.5 to 2.1% by weight, based on the graft base B1, dicyclopentadienylacrylate (DCPA) are used alone or in a mixture with at least one further of the above mentioned monomers B12, especially in mixture with allyl(meth)acrylate, as monomer B12.

Furthermore, the at least one graft base B1 can comprise optionally one or more copolymerizable, monoethylenically unsaturated monomers B13, different from B11 and B12. Monomers B13 can for example be selected from butadiene, isoprene, styrene, acrylonitrile, methylmethacrylate and vinylmethylether.

In particular, graft base B1, comprising monomers B11, B12 and optionally B13, as well as its preparation are known and described in the literature, e.g. DE-A 28 26 925, DE-A 31 49 358 and DE-A 34 14 118.

In a preferred embodiment the graft copolymer B comprises at least one graft base B1, preferably a cross-linked polybutylacrylate rubber described above, and exactly one graft shell B2, obtained by emulsion polymerization of monomers B21 and B22 as described above, especially styrene and acrylonitrile, in presence of the graft base B1 (single-stage graft).

In a further preferred embodiment the graft copolymer B comprises at least one graft base B1, preferably a cross-linked polybutylacrylate rubber described above, and two graft shells B2' and B2", wherein B2' is obtained from emulsion polymerization of monomer B21, especially styrene, in presence of graft base B1 and the graft shell B2" is obtained from subsequent emulsion polymerization of monomers B21 and B22 as described above, especially styrene and acrylonitrile, in presence of graft base B1 grafted with B2' (two-stage graft).

In a preferred embodiment (single-stage graft) the graft copolymer B comprises:
B1: 50 to 70% by weight, preferably 55 to 65% by weight, more preferably 58 to 65% by weight, based on the graft copolymer B, at least one, preferably exactly one, graft base B1 as described above;
B2: 30 to 50% by weight, preferably 35 to 45% by weight, more preferably 35 to 42% by weight, based on the graft copolymer B, one or more, preferably exactly one graft shell B2, obtained by emulsion polymerization, in presence of at least one graft base B1, of:
B21: 50 to 95% by weight, preferably 65 to 80% by weight, more preferably 70 to 80% by weight, based on the graft base B, at least one monomer B21, selected from styrene, α(alpha)-methylstyrene or mixtures of styrene and at least one further monomer selected from α(alpha)-methylstyrene, p-methylstyrene and $C_1$-$C_4$-alkyl(meth)acrylate (e.g. methylmethacrylate, ethylmethacrylate), preferably selected from styrene, α(alpha)-methylstyrene or mixtures of styrene with α(alpha)-methylstyrene or methylmethacrylate; and
B22: 5 to 50% by weight, preferably 20 to 35% by weight, more preferably 20 to 30% by weight, based on the graft shell B2, at least one ethylenically unsaturated monomer B22, selected from acrylonitrile or mixtures of acrylonitrile and at least one further monomer selected from methacrylonitrile, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmaleimide), preferably selected from acrylonitrile or mixtures of acrylonitrile an methacrylontrile;
wherein the total sum of graft base B1 and graft shell B2 is 100% by weight.

In another preferred embodiment (two-stage graft B2' and B2") the graft copolymer B comprises:
B1: 50 to 70% by weight, preferably 60 to 70% by weight, based on the graft copolymer B, at least one, preferably exactly one, graft base B1 as described above;
B2': 10 to 30% by weight, preferably 10 to 20% by weight, more preferably 10 to 15% by weight, based on the graft copolymer B, at least one graft shell B2', which is obtained by emulsion polymerization, in presence of graft base B1, of
B21' 100% by weight, based on graft shell B2', at least one vinylaromatic monomer B21', selected from styrene, α(alpha)-methylstyrene or a mixture of styrene and at least one further monomer selected from α(alpha)-methylstyrene, p-methylstyrene and $C_1$-$C_4$-alkyl(meth)acrylate (e.g. methylmethacrylate, ethylmethacrylate); and
B2": 20 to 40% by weight, preferably 20 to 30% by weight, more preferably 25 to 30% by weight, based on the graft copolymer B, at least one graft shell B2", which is obtained by emulsion polymerization, in presence of graft base B1 grafted with B2', of:
B21": 50 to 95% by weight, preferably 65 to 80% by weight, more preferably 70 to 80% by weight, based on the graft shell B2", at least one vinylaromatic monomer B21", selected from styrene, α(alpha)-methylstyrene or mixtures of styrene and at least one further monomer selected from alpha-methylstyrene, p-methylstyrene and $C_1$-$C_4$-alkyl(meth)acrylate (e.g. methylmethacrylate, ethylmethacrylate), preferably selected from styrene, α(alpha)-methylstyrene or mixtures of styrene and α(alpha)-methylstyrene or methylmethacrylate; and B22": 5 to 50% by weight, preferably 20 to 35% by weight, more preferably 20 to 30% by weight, based on the graft shell B2", at least one ethylenically unsaturated monomer B22", selected from acrylonitrile or mixtures of acrylonitrile and at least one further monomer selected from methacrylonitrile, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-Phenylmaleimide).

More preferably monomers B21, B21' and B21" are styrene or mixtures of styrene and α(alpha)-methylstyrene.

More preferably monomers B22 and B22" are acrylonitrile or mixtures of acrylonitrile and at least one further monomer selected from methacrylonitrile, maleic acid anhydride, N-cyclohexylmaleimide, N-phenylmaleimide, more preferably acrylonitrile or mixtures of acrylonitrile and at least one further monomer selected from methacrylonitrile and maleic acid anhydride. In a more preferred embodiment of the invention monomers B21, B21' and B21" are styrene and monomers B22 and B22' are acrylonitrile.

Typically, the graft copolymer B (obtained as latex) has an average particle diameter (d50, median) in the range of 50 to 1000 nm, preferred 90 to 700 nm. The particle size of latex particles can be governed during synthesis by suitable means known in the literature, e.g. DE-A 28 26 925.

In a preferred embodiment the inventive process covers the synthesis of at least two, preferably two, three or four, different graft copolymers B-V and B-VI based on crosslinked $C_1$-$C_8$ alkyl(meth)acrylate graft bases B1, wherein graft copolymers B-V and B-VI differ in their median particle diameter $d_{50}$. In this preferred embodiment graft copolymer B especially comprises at least two graft copolymers B-V and B-VI, based on crosslinked $C_1$-$C_8$ alkyl (meth)acrylate graft bases B1 as described above, wherein:

graft copolymer B-V (small size ASA rubber) has a median particle diameter $d_{50}$ in the range of 50 to 180 nm, preferably of 80 to 150 nm, more preferably of 90 to 100 nm, and graft copolymer B-VI (large size ASA rubber) has a median particle diameter $d_{50}$ in the range of 200 to 800 nm, preferably of 300 to 700 nm, more preferably of 400 to 600 nm.

Preferably, the graft copolymer B-VI (large size ASA rubber) is desired to have a narrow particle size distribution, wherein particle size distribution $Q=(d_{90}-d_{10})/d_{50}$ is less than 0.3, preferably less than 0.2.

Preferably, the above described graft copolymers B-V and B—VI are prepared and isolated separately. It is also possible to mix graft copolymers B-V and B-VI after producing them separately and isolated them together.

The weight ratio of graft copolymers B-V and B—VI can be varied in wide ranges. Preferably the graft copolymer B is a mixture of graft copolymer B-V and B-VI, wherein the weight ratio of B-V:B-VI is from 90:10 to 10:90, preferably 80:20 to 20:80 and more preferably 70:30 to 35:65.

It is also possible to obtain graft copolymers with different particle sizes, especially bimodal particle size distributions from 50 to 180 nm and 200 to 700 nm, via known agglomeration procedures. Graft copolymers with large and small size particles are for example described in DE-A 36 15 607.

Further Polymer Component P

Optionally, the thermoplastic molding composition comprises 0 to 90% by weight, preferably 0 to 60% by weight, also preferably 0.5 to 30% by weight, more preferably 30 to 90% by weight, based on the total molding composition, at least one further polymer component P. The at least one further polymer component P can be selected from polycarbonates (PC) (including aromatic polycarbonates and aromatic polyester carbonates), polyamides (PA), polyesters, polyoxyalkylene, polyarylene sulfides, polyether ketones, and polyvinyl chlorides. Preferably, the optional polymer component P is selected from polycarbonates (PC) (including aromatic polycarbonates and aromatic polyester carbonates), polyamides (PA), and polyesters, more preferably from polycarbonates and polyamides, most preferably from aromatic polycarbonates and semicrystalline polyamides. In this embodiment the thermoplastic molding composition can for example be an ABS/PC blend, ABS/PA blend, ASA/PC blend or ASA/PA blend.

In a preferred embodiment the thermoplastic molding composition comprises 5 to 60% by weight, preferably 20 to 60% by weight, more preferably 30 to 60% by weight, based on the total molding composition, at least one further polymer component P selected from polycarbonates, polyamides, and polyesters.

Preferably, the further polymer component P is at least one aromatic polycarbonate and/or at least one aromatic polyester carbonate. Aromatic polycarbonates and/or aromatic polyester carbonates, which may be suitable for the present invention, are described in the state of the art and may be prepared by known processes. The preparation of aromatic polycarbonates is for example described in Schnell, "Chemistry and Physics of Polycarbonates", Interscience Publishers, 1964 and DE 1 495 626, DE-A 2 232 877, DE-A 2 703 376, DE-A 2 714 544, DE-A 3 000 610 and DE-A 3 832 396. The preparation of aromatic polyester carbonates is for example described in DE-A 3 077 934. The preparation of aromatic polycarbonates is carried out e.g. by reaction of diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents which are trifunctional or more than trifunctional, for example triphenols or tetraphenols. The preparation via a melt polymerization process by reaction of diphenols with, for example, diphenyl carbonate is also possible.

Diphenols for the preparation of the aromatic polycarbonates and/or aromatic polyester carbonates are preferably those of the formula (I)

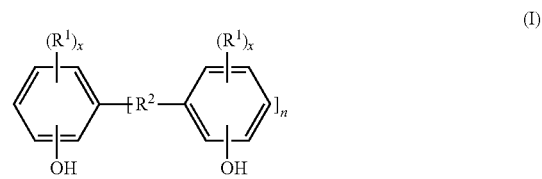

wherein

R$^1$, independently of one another is $C_1$-$C_{12}$-alkyl, preferably methyl, or halogen, preferably chlorine and/or bromine;

x, independently of one another, is 0, 1 or 2;

n is 1 or 0 and

R$^2$ is a single bond, $C_1$-$C_5$-alkylene, $C_2$-$C_5$-alkylidene, $C_5$-$C_6$-cycloalkylidene, —O—, —SO—, —CO—, —S—, —SO2—, $C_6$-$C_{12}$-arylene, on to which further aromatic rings optionally containing heteroatoms may be fused, or a radical of the formula (II) or (III);

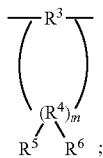  (II)

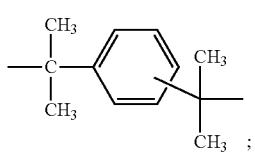  (III)

wherein
R⁴ denotes carbon;
m denotes an integer from 4 to 7, preferably 4 or 5;
R⁵ and R⁶ individually for each R⁴ and independently of one another denote hydrogen or $C_1$-$C_6$-alkyl, preferably hydrogen, methyl or ethyl, with the proviso that on at least one atom R⁴, R⁵ and R⁶ are simultaneously alkyl;

Preferred diphenols are hydroquinone, resorcinol, dihydroxydiphenols, bis(hydroxyphenyl)-$C_1$-$C_5$-alkanes, bis-(hydroxyphenyl)-$C_5$-$C_6$-cycloalkanes, bis(hydroxyphenyl) ethers, bis-(hydroxyphenyl)sulfoxides, bis-(hydroxyphenyl) ketones, bis(hydroxyphenyl)sulfones and α,α-bis-(hydroxyphenyl)-diisopropyl-benzenes and nucleus-brominated and/or nucleus-chlorinated derivatives thereof. Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-chloro-4-hydroxyphenyl)-propane, 2,2-bis-(3,5-dichloro-4-hydroxyphenyl)propane or 2,2-bis-(3,5-dibromo-4-hydroxyphenyl)-propane. 2,2-bis-(4-hydroxyphenyl)propane (bisphenol A) is particularly preferred. The diphenols may be employed individually or as any desired mixtures. The diphenols are known from the literature or obtainable by processes known from the literature.

Chain terminators, which are suitable for the preparation of the aromatic polycarbonates, are, for example, phenol, p-chlorophenol, p-tert-butylphenol or 2,4,6-tribromophenol, and also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 to 10 mol %, based on the sum of the moles of the particular diphenols employed.

The aromatic polycarbonates have average weight-average molecular weights $M_w$, measured e.g. by ultracentrifuge or scattered light measurement, of from 10,000 to 200,000 g/mol, preferably 15,000 to 80,000 g/mol, particularly preferably 24,000 to 32,000 g/mol. The aromatic polycarbonates may be branched in a known manner, and in particular preferably by incorporation of from 0.05 to 2.0 mol %, based on the sum of the diphenols employed, of compounds which are trifunctional or more than trifunctional, for example those having three and more phenolic groups. Both homopolycarbonates and copolycarbonates are suitable. It is also possible to employ 1 to 25% by weight, preferably 2.5 to 25% by weight, based on the total amount of diphenols to be employed, polydiorganosiloxanes having hydroxyaryloxy end groups for the preparation of co-polycarbonates suitable as component P. These are known e.g. from U.S. Pat. No. 3,419,634, and may be prepared by processes known from the literature. For example the preparation of copolycarbonates containing polydiorganosiloxanes is described in DE-A 3 334 782.

Preferred polycarbonates suitable as component P are, in addition to the bisphenol A homopolycarbonates, the copolycarbonates of bisphenol A with up to 15 mol %, based on the sum of the moles of diphenols, of diphenols different from bisphenol A and as mentioned above, in particular 2,2-bis-(3,5-dibromo-4-hydroxyphenyl)-propane.

Aromatic dicarboxylic acid dihalides suitable for the preparation of aromatic polyester carbonates are preferably the diacid dichlorides of isophthalic acid, terephthalic acid, diphenyl ether-4,4'-dicarboxylic acid and of naphthalene-2,6-dicarboxylic acid. Mixtures of the diacid dichlorides of isophthalic acid and of terephthalic acid in a ratio of between 1:20 and 20:1 are particularly preferred. A carbonic acid halide, preferably phosgene, is additionally co-used as a bifunctional acid derivative in the preparation of polyester carbonates. Suitable chain terminators for the preparation of the aromatic polyester carbonates are, in addition to the monophenols already mentioned, also chlorocarbonic acid esters thereof as well as the acid chlorides of aromatic monocarboxylic acids, which may optionally be substituted by $C_1$-$C_{22}$alkyl groups or by halogen atoms, as well as aliphatic $C_2$-$C_{22}$-monocarboxylic acid chlorides. The amount of chain terminators is in each case 0.1 to 10 mol %, based on the moles of diphenol in the case of the phenolic chain terminators and based on the moles of dicarboxylic acid dichloride in the case of monocarboxylic acid chloride chain terminators. The aromatic polyester carbonates may also contain incorporated aromatic hydroxycarboxylic acids.

The aromatic polyester carbonates may be either linear or branched in a known manner (see e.g. DE-A 2 940 024 and DE-A 3 007 934). Branching agents which may be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol %, based on the dicarboxylic acid dichlorides employed, or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri(4-hydroxyphenyl)-benzene, 1,1,1-tri-(4-hydroxyphenyl)-ethane, tri-(4-hydroxyphenyl)phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hydroxyphenyl)-2-(2,4-dihydroxyphenyl)propane, tetra-(4-[4-hydroxyphenyl-isopropyl]-phenoxy)-methane and 1,4-bis-[4,4'- dihydroxytriphenyl)-methyl]-benzene, in amounts of from 0.01 to 1.0 mol %, based on the diphenols employed.

Phenolic branching agents may be initially introduced into the reaction vessel with the diphenols, and acid chloride branching agents may be introduced together with the acid dichlorides.

The content of carbonate structural units in the thermoplastic, aromatic polyester carbonates may be varied as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates may be present in the polycondensate in the form of blocks or in random distribution.

The relative solution viscosity ($\eta_{rel}$) of the aromatic polycarbonates and polyester carbonates is in the range of 1.18 to 1.4, preferably 1.20 to 1.32 (measured on solutions of 0.5 g polycarbonate or polyester carbonate in 100 ml methylene chloride solution at 25° C.). The aromatic polycarbonates and polyester carbonates may be employed by themselves or in any desired mixture of one or more, preferably one to three or one or two thereof. Most preferably only one type of polycarbonate is used.

Most preferably the aromatic polycarbonate is a polycarbonate based on bisphenol A and phosgene, which includes polycarbonates that have been prepared from corresponding precursors or synthetic building blocks of bisphenol A and phosgene. These preferred aromatic polycarbonates may be linear or branched as described above.

In particular the preparation of aromatic polycarbonate/aromatic polyester carbonate is carried out by reacting diphenols, preferably bisphenole A, carbonic acid halides, preferably phosgene, and optionally aromatic dicarboxylic acid halides, preferably benzenedicarboxylic acid halides. For example suitable aromatic polycarbonates and aromatic polyester carbonate and their preparation are described in DE-A 2 714 544, DE-A 3 000 610, DE-A 3 832 396 and DE-A 3 077 934.

Preferably, the further polymer component P is at least one polyamide selected from homopolyamides, copolyamides and mixtures of such polyamides. Suitable polyamides and methods for their production are known from the state of the art. In particular suitable semi-crystalline polyamides are polyamide-6, polyamide-6,6, mixtures and corresponding copolymers of those components.

Also included are polyamides wherein the acid component consists wholly or partially of terephthalic acid and/or isophthalic acid and/or suberic acid and/or sebacic acid and/or azelaic acid and/or adipic acid and/or cyclohexanedicarboxylic acid, the diamine component consists wholly or partially of m- and/or p-xylylene-diamine and/or hexamethylenediamine and/or 2,2,4-trimethylhexamethylenediamine and/or 2,2,4-trimethylhexamethylenediamine and/or isophoronediamine.

In particular amorphous polyamides can be used as further polymer component P, which are obtained by polycondensation of diamines, such as ethylenediamine, hexamethylenediamine, decamethylenediamine, 2,2,4-and/or 2,4,4-trimethylhexamethylenediamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5-and/or 2,6-bis-(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4-and/or 2,4,4-trimethyladipic acid, isophthalic acid and terephthalic acid.

Mention may also be made of polyamides that are prepared wholly or partially from lactams having from 7 to 12 carbon atoms in the ring, optionally with the concomitant use of one or more of the above-mentioned starting components.

Also suitable are polyamide copolymers obtained by polycondensation of a plurality of monomers, as well as copolymers prepared with the addition of aminocarboxylic acids such as ε-aminocaproic acid, w-aminoundecanoic acid or w-aminolauric acid or their lactams. Particularly suitable amorphous polyamides are polyamides prepared from isophthalic acid, hexamethylenediamine and further diamines such as 4,4'-diaminodicyclohexylmethane, isophoronediamine, 2,2,4-and/or 2,4,4-trimethylhexamethylenediamine, 2,5-and/or 2,6-bis-(aminomethyl)-norbornene; or from isophthalic acid, 4,4'-diamino-dicyclohexylmethane and ε-caprolactam; or from isophthalic acid, 3,3'-dimethyl-4,4'-diamino-dicyclohexylmethane and laurinlactam; or from terephthalic acid and the isomeric mixture of 2,2,4-and/or 2,4,4-trimethylhexamethylenediamine. Instead of pure 4,4'-diaminodicyclohexylmethane it is also possible to use mixtures of the position-isomeric diaminodicyclohexylmethanes, which are composed of from 70 to 99 mol % of the 4,4'-diamino isomer, from 1 to 30 mol % of the 2,4'-diamino isomer, from 0 to 2 mol % of the 2,2'-diamino isomer and optionally corresponding to more highly condensed diamines, which are obtained by hydrogenation of industrial grade diaminodiphenylmethane. Typically, the isophthalic acid may be replaced by terephthalic acid up to 30%.

The polyamides preferably have a relative viscosity from 2.0 to 5.0, particularly preferably from 2.5 to 4.0 (measured on a 1% by weight solution in m-cresol or 1% weight/volume solution in 96% by weight sulfuric acid at 25° C.).

Polyesters which are suitable as further polymer component P, are preferably polyalkylene terephthalates, which typically are reaction products of aromatic dicarboxylic acids or reactive derivatives thereof (e.g. dimethyl esters or anhydrides) and aliphatic, cycloaliphatic or arylaliphatic diols, and mixtures of such reaction products. Preferred polyalkylene terephthalates may be prepared from terephthalic acids (or reactive derivatives thereof) and aliphatic or cycloaliphatic diols having from 2 to 10 carbon atoms according to known methods (Kunststoff-Handbuch, Volume VIII, p. 695 ff, Carl Hanser Verlag, Munich 1973).

In preferred polyalkylene terephthalates, from 80 to 100 mol %, preferably from 90 to 100 mol %, of the dicarboxylic acid radicals are terephthalic acid radicals, and from 80 to 100 mol %, preferably from 90 to 100 mol %, of the diol radicals are ethylene glycol and/or 1,4-butanediol radicals. The preferred polyalkylene terephthalates may contain, in addition to ethylene glycol or 1,4-butanediol radicals, from 0 to 20 mol % of radicals of other aliphatic diols having from 3 to 12 carbon atoms or cycloaliphatic diols having from 6 to 12 carbon atoms, for example radicals of 1,3-propanediol, 2-ethyl-1,3-propanediol, neopentyl glycol, 1,5-pentanediol, 1,6-hexanediol, 1,4-cyclohexanedimethanol, 3-methyl-1,3- and -1,6-pentanediol, 2-ethyl-1,3-hexanediol, 2,2-diethyl-1,3-propanediol, 2,5-hexanediol, 1,4-di(β-hydroxyethoxy)-benzene, 2,2(bis-4-hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (for example described in DE-A 2 407 647, 2 407 776, 2 715 932).

The polyalkylene terephthalates may be branched by incorporation of relatively small amounts of tri- or tetra-hydric alcohols or tri- or tetra-basic carboxylic acids, such as are described in DE-A 1 900 270 and U.S. Pat. No. 3,692,744. Examples of preferred branching agents are trimesic acid, trimellitic acid, trimethylol-ethane and -propane and pentaerythritol. It is advisable to use not more than 1 mol % of the branching agent, based on the acid component. Particular preference is given to polyalkylene terephthalates that have been prepared solely from terephthalic acid or reactive derivatives thereof (e.g. dialkyl esters thereof) and ethylene glycol and/or 1,4-butanediol, and mixtures of such polyalkylene terephthalates.

Preferred polyalkylene terephthalates are also co-polyesters prepared from at least two of the above-mentioned alcohol components: particularly preferred co-polyesters are poly (ethylene glycol 1,4-butanediol) terephthalates.

The polyalkylene terephthalates that are preferably suitable generally have an intrinsic viscosity of from 0.4 to 1.5 dl/g, preferably from 0.5 to 1.3 dl/g, especially from 0.6 to 1.2 dl/g, in each case measured in phenol/o-dichlorobenzene (1:1 parts by weight) at 25° C.

Additive(s) K

In particular the thermoplastic molding composition obtained by the inventive process may comprises 0 to 30% by weight, preferably 0 to 10% by weight, based on the total thermoplastic molding composition, of at least one additive K. More preferably the at least one additive K is present in an amount of 0.001 to 10% by weight, more preferably 0.01 to 5% by weight, based on the total thermoplastic molding composition. In particular the additive K is not a polymeric compound.

The optional additive K may be selected from commonly known additives and/or auxiliaries for plastic materials. With respect to conventional auxiliaries and additives, reference is made by way of example to "Plastics Additives Handbook", Ed. Gächter and Müller, 4th edition, Hanser Publ., Munich, 1996. For example the at least one additive K may be selected from fillers, reinforcing agents, dyes, pigments, lubricants or mold-release agents, stabilizers, in particular light and heat stabilizers, antioxidants, UV absorbers, plasticizers, impact modifiers, antistatic agents, flame retardants, bactericides, fungicides, optical brighteners, and blowing agents.

The optional additive K is preferably selected from dyes, pigments, lubricants or mold-release agents, stabilizers, in particular light stabilizers, antistatic agents, flame retardants and fillers, in particular mineral fillers.

Examples that may be mentioned of fillers, which may be selected from particulate fillers or reinforcing agents, are silicates, amorphous silica, calcium silicates, such as wollastonite, powdered quartz, mica, metal oxides, metal hydroxides, carbon black, graphite, barium sulfate, calcium carbonate, magnesium carbonate, bentonites, talc, kaolin, carbon fibres or glass fibres in the form of glass woven, glass mats, or glass silk rovings, chopped glass, or glass beads. In particular at least one particulate fillers, preferably a mineral filler, can be used as additive K.

Examples of suitable pigments are titanium dioxide, phthalocyanines, ultramarine blue, iron oxides, or carbon black, and also the entire class of organic pigments.

Common stabilizers for thermoplastic polymers encompass stabilizers for improving thermal stability, which are commonly agents to counteract thermal decomposition, light stabilizers (stabilizers for increasing lightfastness), and stabilizers for raising resistance to hydrolysis and to chemicals.

Examples of suitable light stabilizers are various substituted resorcinols, salicylates, benzotriazoles, and benzophenones.

Examples of suitable stabilizers are hindered phenols, but also vitamin E and compounds whose structure is analogous thereto. HALS stabilizers (Hindered Amine Light Stabilizers), benzophenones, resorcinols, salicylates, and benzotriazoles are also suitable.

Suitable lubricants or mold-release agents are fatty acids having from 12 to 30 carbon atoms, salts and derivatives thereof, for example stearic acid and stearates, palmitic acid and palmitates, stearyl alcohol, stearic esters, amide waxes (e.g. stearamides, in particular ethylene bis(stearamide) (EBS)), and polyolefin waxes. Particularly suitable lubricants and mold-release agents are stearic acid, stearates (e.g. magnesium stearate), palmitic acid, palmitates (e.g. sodium palmitate), ethylene bis(stearamide) (e.g. Irgawax®, Ciba, Switzerland) and mixtures thereof. Preferably the thermoplastic molding composition comprises 0.05 to 5% by weight, preferably 0.1 to 3% by weight, based on the total thermoplastic molding composition, of at least one lubricant or mold-release agents, more preferably ethylene bis(stearamide), at least one alkaline metal or alkaline earth metal stearate and/or at least one alkaline metal or alkaline earth metal palmitate. In a preferred embodiment the thermoplastic molding composition comprises 0.1 to 5% by weight, based on the total thermoplastic molding composition potassium stearate and/or potassium palmitate.

Furthermore, it is possible that the thermoplastic composition comprises as component K residues of the at least one surfactant C used for production of the stabilizer dispersion S as described above, selected from surface active agents and protective colloids.

Crystallization Additive C

The inventive process includes the addition of at least one crystallization additive C selected from phosphate compounds having 1 to 25 phosphate units, organic acids and salts thereof, wherein the organic acids have at least two functional groups selected from acidic groups, preferably carboxyl groups, and hydroxyl groups with the proviso that at least one functional group is an acidic group, and wherein the organic acids encompass at least three carbon atoms per functional group, during and/or after any of steps a), b) and/or c), wherein the crystallization additive C is added in an amount of 0.005 to 1.6% by weight, preferably of 0.01 to 1.2% by weight, more preferably 0.02 to 0.5% by weight also preferably 0.3 to 1.2% by weight, also preferably 0.4 to 1% by weight, based on the solid content of the at least one graft copolymer B. The amount of additive C is given on the basis of the solid content of the additive C (e.g. if the additive is used in form of an aqueous solution) or based on the amount of the compounds of additive C as defined in the present invention.

Preferably, the organic acids or salts thereof encompass at least three carbon atoms per acidic group, preferably at least three carbon atoms per carboxyl group (—COOH). Preferably, the organic acids or salts thereof have 2 to 10 carbon atoms and 2 to 6 acidic groups, preferably selected from carboxyl groups (—COOH).

Preferably the crystallization additive C is selected from phosphate compounds having 1 to 25 phosphate units, organic acids and salts thereof, which have 2 to 10 carbon atoms and 2 to 6 acidic groups, preferably selected from carboxyl groups (—COOH).

Preferably, the compounds of the crystallization additives C are typically anions and may have any counterion as long as the salt is reasonably soluble, i.e. considering all components added until precipitation the component is completely soluble in water between 50° C. and 90° C. For example the counterion of additive C is selected from ammonium ion, alkaline metal ions and/or alkaline earth metal ions, preferably from alkaline metal ions, e.g. sodium or potassium.

In terms of the present invention, a phosphate compound is a compound selected from phosphoric acids, esters of phosphoric acid and salts of phosphoric acid, in particular ortho-, di-, meta- and/or polyphosphates. Typically, the phosphate compound comprises at least one phosphate unit of formula —[O—P(=O)OH]—. The phosphate units may be arranged as a straight chain or a branched chain or may also form circles (metaphosphates) or be combinations thereof. In particular phosphoric acids include orthophosphoric acid ($H_3PO_4$), diphosphoric acid (also referred to as pyrophosphoric acid, $H_4P_2O_7$), metaphosphoric acids (($HPO_3)_n$ with n=3 to 25) and polyphosphoric acids (HO$(PO_2OH)_n$—H with n=3 to 25). Respectively, salts of phosphoric acids preferably include orthophosphates, e.g. $M^I(H_2PO_4)$, $M^I_2(HPO_4)$; diphosphates (also referred to as pyrophosphates), e.g. $M^I(H_3P_2O_7)$, $M^I_2(H_2P_2O_7)$; partly or completely neutralized metaphosphates, e.g. $(M^IPO_3)_n$ with n=3 to 25; and partly or completely neutralized polyphosphates, e.g. $HO(PO_2OH)_nM^I$ with n=3 to 25, wherein $M^I$ is a monovalent metal ion.

In terms of the present invention salts of phosphoric acids includes the respective primary salts (e.g. dihydrogen phosphate $H_2PO_4^-$), the secondary salts (e.g. hydrogen phosphate $(HPO_4)^{2-}$), the tertiary salts (e.g. orthophosphate $(PO_4)^{3-}$) and following salts obtained by replacement of three or more hydrogen atoms with metal ions (e.g. tetrasodium diphosphate, $Na_4P_2O_7$). As a skilled person knows the corresponding primary, secondary and tertiary salts of phosphoric acids are present in aqueous solution mainly based on the respective dissociation constant, depending on e.g. pH and temperature in the aqueous medium. Preferably, the salts of phosphoric acids comprises at least one ammonium ion, alkaline metal ion and/or an alkaline earth metal ion, most preferably at least one alkaline metal ion, e.g. sodium or potassium.

Furthermore, a skilled person is aware of the fact, that diphosphate, metaphosphate and polyphosphate compounds may hydrolyze in aqueous solution depending on pH, temperature and time, in particular resulting in ortho phosphate compounds finally. In particular, in terms of the invention the presence of a specific phosphate compound means that the stability of such phosphate compound in aqueous medium is given for the required period (depending on duration of process steps and time of addition of crystallization additive C). Preferably the respective phosphate compound is present in aqueous medium together with its hydrolysis products, wherein the respective phosphate compound is present in an amount of at least 50% by weight, preferably at least 80% by weight, preferably at least 90% by weight, based on total amount of phosphate compound added, for the required period.

In terms of the present invention, also a compound resulting in a phosphate compound as described after addition to the aqueous medium (e.g. by hydrolysis) can be used as complexing agent C.

In a preferred embodiment the crystallization additive C is selected from phosphate compounds having 1 to 25 phosphate units (—[O—P(=O)OH]—), preferably 1 to 14 phosphate units, more preferably 1 to 9 phosphate units, also preferably 2 to 9 phosphate units, wherein the phosphate units may be partly or completely neutralized. Preferably the crystallization additive C is selected from orthophosphoric acid; diphosphoric acid; polyphosphoric acids of formula $HO(PO_2OH)_n$—H with n=3 to 25, preferably 3 to 14, more preferably 3 to 9; orthophosphates (e.g. alkaline orthophosphates); diphosphates (e.g. alkaline diphosphates); partly or completely neutralized metaphosphates having 3 to 25 phosphate units, preferably 3 to 14 phosphate units, more preferably 3 to 9 phosphate units, also preferably 6 to 9 phosphate units; partly or completely neutralized polyphosphates having 3 to 25 phosphate units, preferably 3 to 14 phosphate units, more preferably 3 to 9 phosphate units, also preferably 3 to 6 phosphate units, and mixtures thereof. Orthophosphates, diphosphates and triphosphates are especially preferred. In particular alkaline metal salts or ammonium salts of phosphates, diphosphates and triphosphates are especially preferred. More preferably sodium salts of phosphates, diphosphates and triphosphates are used as crystallization additive C.

In a preferred embodiment the at least one crystallization additive C is selected from orthophosphoric acid ($H_3PO_4$); diphosphoric acid ($H_4P_2O_7$); polyphosphoric acids of formula $HO(PO_2OH)_n$—H with n=3 to 25, preferably 3 to 14, more preferably 3 to 9; sodium dihydrogen phosphate ($NaH_2PO_4$); disodium hydrogen phosphate ($Na_2HPO_4$); trisodium phosphate ($Na_3PO_4$); sodium trihydrogen diphosphate ($NaH_3P_2O_7$); disodium dihydrogen diphosphate ($Na_2H_2P_2O_7$); trisodium hydrogen diphosphate ($Na_3HP_2O_7$); tetrasodium diphosphate ($Na_4P_2O_7$); potassium dihydrogen phosphate ($KH_2PO_4$); dipotassium hydrogen phosphate ($K_2HPO_4$); tripotassium phosphate ($K_3PO_4$); potassium trihydrogen diphosphate ($KH_3P_2O_7$); dipotassium dihydrogen diphosphate ($K_2H_2P_2O_7$); tripotassium hydrogen diphosphate ($K_3HP_2O_7$); tetrapotassium diphosphate ($K_4P_2O_7$); sodium metaphosphates of formula $(NaPO_3)_n$ with n=3 to 25, preferably 3 to 14, more preferably 3 to 9; potassium metaphosphates of formula $(KPO_3)_n$ with n=3 to 25, preferably 3 to 14, more preferably 3 to 9; partly or completely neutralized sodium polyphosphate of formula $YO(PO_2OY)_n$—Y, where Y is H or Na, n is a number from 3 to 25, preferably 3 to 14, more preferably 3 to 9, with the proviso that at least one Y is Na (for example $HO(PO_2OH)_n$Na or $NaO(PO_2OH)_n$Na with n=3 to 25); partly or completely neutralized potassium polyphosphate of formula $YO(PO_2OY)_n$—Y, where Y is H or K, n is a number from 3 to 25, preferably 3 to 14, more preferably 3 to 9, with the proviso that at least one Y is K.

More preferably, the at least one crystallization additive C is selected from orthophosphoric acid; polyphosphoric acids of formula $HO(PO_2OH)_n$—H with n=3 to 25, preferably 3 to 14, more preferably 3 to 9, disodium hydrogen phosphate ($Na_2HPO_4$), disodium dihydrogen diphosphate ($Na_2H_2P_2O_7$), tetrasodium diphosphate ($Na_4P_2O_7$), sodium hexa-metaphosphate ($NaPO_3)_6$, partly or completely neutralized sodium polyphosphate of formula $YO(PO_2OY)_n$—Y, where Y is H or Na, n is a number from 3 to 14, preferably 3 to 9, more preferably from 3 to 6, with the proviso that at least one Y is Na; and mixtures thereof.

In a preferred embodiment the at least one crystallization additive C is a mixture of two or more (preferably 2 to 4, more preferably 2) phosphate compounds having 1 to 25 phosphate units (—[O—P(=O)OH]—, preferably 1 to 14 phosphate units, more preferably 1 to 9 phosphate units, also preferably 2 to 9 phosphate units, wherein the phosphate units may be partly or completely neutralized. Preferably, the crystallization additive C is a mixture of two or more (preferably 2 to 4, more preferably 2) phosphate compounds selected from orthophosphoric acid; polyphosphoric acids of formula $HO(PO_2OH)_n$—H with n=3 to 25, preferably 3 to 14, more preferably 3 to 9, disodium hydrogen phosphate ($Na_2HPO_4$), disodium dihydrogen diphosphate ($Na_2H_2P_2O_7$), tetrasodium diphosphate ($Na_4P_2O_7$), sodium hexa-metaphosphate ($NaPO_3)_6$, partly or completely neutralized sodium polyphosphate of formula $YO(PO_2OY)_n$—Y, where Y is H or Na, n is a number from 3 to 14, preferably 3 to 9, more preferably from 3 to 6, with the proviso that at least one Y is Na.

In an preferred embodiment the crystallization additive C is a mixture comprising (preferably consisting of) at least two phosphate salts, selected from dihydrogen phosphates, hydrogen phosphates, orthophospates, trihydrogen diphosphates, dihydrogen diphosphates, hydrogen diphosphate and diphosphates. More preferably the crystallization additive C is a mixture comprising (preferably consisting of) at least two diphosphate salts, preferably selected from trihydrogen diphosphate ($H_3P_2O_7^-$), dihydrogen diphosphate ($H_2P_2O_7^{2-}$), hydrogen diphosphate ($HP_2O_7^{3-}$), and diphosphate, $P_2O_7^{4-}$. Preferably, the crystallization additive C is a mixture comprising (preferably consisting of) disodium dihydrogen diphosphate ($Na_2H_2P_2O_7$) and tetrasodium diphosphate ($Na_4P_2O_7$), preferably in a mass ratio of 0.5:1 to 1:0.5, preferably 0.5:1 to 1:1, more preferably in a mass ratio of 0.75:1 (ratio (ratio $Na_2H_2P_2O_7$:$Na_4P_2O_7$).

Preferably, the mixture of two or more phosphate compounds is used in form of an aqueous solution in the inventive process as crystallization additive C. Preferably, the combination of two or more phosphate compounds as crystallization additive C is selected in such way that the pH value of the aqueous solution of said compounds is within the desired range, more preferably the pH value of the aqueous solution of said additives C is in the range of 6 to 8, more preferably 6.5 to 7.5.

In terms of the present invention organic acids and salts thereof are organic substances, which contain carboxylate groups —COOH and/or other OH acidic groups, for example hydroxyl groups —OH next to strong electron withdrawing groups as in ascorbic acid. In a preferred embodiment the crystallization additive C is at least one organic acid or salt thereof (e.g. the alkaline metal salt thereof), wherein the organic acid have 2 to 10, preferably 2 to 6, carbon atoms and 2 to 6, preferably 2 to 3 acidic groups, preferably selected from carboxyl groups (—COOH).

Preferably the at least one crystallization additive C is selected from an organic acid or a salt thereof, wherein the organic acid has the formula HOOC—$R^1$—COOH, with $R^1$ is a bond, an alkylene radical having 1 to 8 carbon atoms, which may be linear or branched, and which may be substituted, for example with one or more hydroxyl groups or carboxyl groups, or an alkenylene radical having 1 to 8 carbon atoms, which may be linear or branched, and which may be substituted, for example with one or more hydroxyl groups or carboxyl groups.

Preferably the at least one crystallization additive C is selected from oxalic acid (ethanedioic acid), malonic acid (propandioic acid), succinic acid (butanedioic acid), glutaric acid (pentanedioic acid), adipic acid (hexanedioic acid), maleic acid (Z-butenediolic acid), fumaric acid ((Z-butenediolic acid), malic acid (2-hydroxybutanedioic acid), citric acid (2-hydroxypropane-1,2,3-tricarboxylic acid), tartaric acid (2,3-dhydroxybutanedioic acid), ascorbic acid and salts thereof. More preferably the at least one crystallization additive C is selected from oxalic acid, malonic acid, succinic acid, glutaric acid, malic acid, citric acid, tartaric acid and salts thereof. More preferably the at least one crystallization additive C is selected from oxalic acid, citric acid and salts thereof. In a preferred embodiment the above mentioned organic acids used in form of their free acid (not neutralized). It is also possible to use one or more salt of the above mentioned organic acids, wherein the counterion can be selected arbitrarily as long as the salt is reasonably soluble, i.e. considering all components added until precipitation the component is completely soluble in water between 50° C. and 90° C. Furthermore, the magnesium salt of citric acid, trimagnesium di(2-hydroxypropane-1,2,3-tricarboxylate) is preferably be used as crystallization additive C.

The at least one crystallization additive C may be partly neutralized, completely neutralized or not neutralized (i.e. an acid). Partly neutralized or completely neutralized compounds are preferred. Furthermore, in a preferred embodiment the at least one organic acid is used in a not neutralized form, i.e. as free acid.

In a more preferred embodiment, the crystallization additive C is at least one compound selected from orthophosphoric acid; polyphosphoric acids of formula $HO(PO_2OH)_n$—H with n=3 to 25, preferably 3 to 14, more preferably 3 to 9; disodium hydrogen phosphate ($Na_2HPO_4$); disodium dihydrogen diphosphate ($Na_2H_2P_2O_7$); tetrasodium diphosphate ($Na_4P_2O_7$); sodium hexa-metaphosphate ($NaPO_3)_6$; and partly or completely neutralized sodium polyphosphate of formula $YO(PO_2OY)_n$—Y, where Y is H or Na, n is a number from 3 to 14, preferably 3 to 9, more preferably from 3 to 6, with the proviso that at least one Y is Na; oxalic acid, malonic acid, succinic acid, glutaric acid, malic acid, citric acid, tartaric acid and salts thereof. More preferably the crystallization additive C is at least one compound selected from orthophosphoric acid; disodium hydrogen phosphate ($Na_2HPO_4$), disodium dihydrogen diphosphate ($Na_2H_2P_2O_7$), tetrasodium diphosphate ($Na_4P_2O_7$), sodium hexa-metaphosphate ($NaPO_3)_6$, oxalic acid, salts of oxalic acids, citric acid, and salts of citric acid.

Furthermore, a combination of the above mentioned compounds may be used as crystallization additive C in order to obtain a better surface quality. In this preferred embodiment, the crystallization additive C is a combination of at least one acidic compound selected from orthophosphoric acid; oxalic acid or citric acid; and at least one salt of phosphoric acids selected from orthophosphates (e.g. alkaline orthophosphates); diphosphates (e.g. alkaline diphosphates); partly or completely neutralized metaphosphates having 3 to 25 phosphate units, preferably 3 to 14 phosphate units, more preferably 3 to 9 phosphate units, also preferably 6 to 9 phosphate units; partly or completely neutralized polyphosphates having 3 to 25 phosphate units, preferably 3 to 14 phosphate units, more preferably 3 to 9 phosphate units; more preferably at least one phosphate compound selected from sodium dihydrogen phosphate ($NaH_2PO_4$); disodium hydrogen phosphate ($Na_2HPO_4$); sodium trihydrogen diphosphate ($NaH_3P_2O_7$), disodium dihydrogen diphosphate ($Na_2H_2P_2O_7$); trisodium hydrogen diphosphate ($Na_3HP_2O_7$), tetrasodium diphosphate ($Na_4P_2O_7$), sodium hexa-metaphosphate ($NaPO_3)_6$; partly or completely neutralized sodium polyphosphate of formula $YO(PO_2OY)_n$—Y, where Y is H or Na, n is a number from 3 to 14, preferably 3 to 9, more preferably from 3 to 6, with the proviso that at least one Y is Na; and mixtures thereof. In particular the mass ratio of the acidic compound to the salt of phosphoric acids is in the range of 1:3 to 1:1, preferably 1:1.5. In one particular embodiment the crystallization additive C is a mixture of oxalic acid and/or orthophosphoric acid with tetrasodium diphosphate, preferably in a mass ratio of 1:1 to 1:3, preferably 1.1.5 to 1:2.

Step a)—Emulsion Polymerization of Graft Base B1

Step a) of the inventive process encompasses preparation of the at least one graft base B1 via emulsion polymerization of the at least one monomer B11, and optional B12 and/or B13, and optional addition of the at least one agglomerating component B14.

Typically the graft base B1 (obtained as latex in step a)) has an average particle diameter (weight mean particle size $D_{50}$) of 50 to 200 nm, preferred 90 to 120 nm. The particle size of latex particles can be governed during synthesis by suitable means known in the literature, e.g. DE-A 28 26 925.

Preferably, the emulsion polymerisation of step a) is carried out by aqueous free-radical emulsion polymerization, wherein suitable additives, such as surfactants, buffers and initiators, are added. The reaction is typically initiated via water-soluble free-radical polymerization initiators. Suitable surfactants, buffers and initiators are described in WO 2015/150223 and WO 2015/078751. Typically, a weight ratio of water/monomer in the range of 2:1 to 0.7:1 is employed.

Typically, at least one surfactant is added in polymerization step a). Further, additional surfactant can be added in step b). In terms of the present invention a surfactant is a compound reducing the surface tension of the aqueous phase and/or a protective colloids that helps to stabilize a dispersion, in particular a suspension, an emulsion or a suspoemulsion against sedimentation. Suitable surfactants are surface-active agents or protective colloids commonly known for the preparation of emulsions and suspensions, in particular of aqueous emulsions and suspensions. Mixtures of surface active agents and/or protective colloids may also be used.

Preferably the surfactant is at least one compound selected from alkali metal salts of alkyl- or arylsulfonic acids, alkyl sulfates, fatty alcohol sulfonates, salts of higher fatty acids comprising 10 to 30 carbon atoms or resin soaps. More preferably, the at least one surfactant is selected from sodium or potassium salts of alkylsulfonates and fatty acids having from 10 to 18 carbon atoms and resin based soap. In a preferred embodiment the surfactant is selected from alkylsulfonates, arylalkylsulfonates, fatty acids, and sodium and potassium salts thereof. More preferable the at least on surfactant is selected from fatty acids, in particular fatty acids having a aliphatic hydrocarbon chain of 10 to 30, preferably 10 to 18, carbon atoms and sodium and potassium salts thereof or resin based soap. More preferably the surfactant is at least one fatty acid or salt thereof, selected from oleic acid, stearic acid, palmitic acid and sodium and potassium salts thereof. Also mixtures of different surfactants are possible. Typically, the at least one surfactant is employed in an amount of from 0.2 to 7% by weight, preferably from 0.5 to 5% by weight, based on the total weight of the monomers used for the emulsion polymerization of graft base B1 in step a).

It is possible to use any initiators which decay at the selected reaction temperature into radicals. Typically, initiators can be used which thermally decompose or decompose in the presence of a redox system. Preferably, at least one organic and/or inorganic peroxide compound (comprising at least one peroxide group R—O—O—H and/or R—O—O—R), e.g. hydrogen peroxide, cumene hydroperoxide, tert-butyl hydroperoxide, p-menthane hydroperoxide, ammonium, potassium and sodium persulfate is the initiator or part of the initiator system. In particular polymerization initiators employed in step a) are the commonly used persulfates, such as sodium or potassium peroxodisulfate, or mixtures thereof. In a preferred embodiment, an inorganic peroxide salt, in particular an inorganic peroxodisulfate salt, preferably sodium peroxodisulfate and/or potassium peroxodisulfate is used in the emulsion polymerization. Furthermore, redox systems and azo-compounds are also suitable. In the case of redox initiators, typically organic hydroperoxides, reducing agents and optionally transition metal salts, e.g. iron-II-sulfate are employed. Examples for reducing agents are glucose, sucrose, ascorbic acid, sodium ascorbate, and sodium hydroxymethylsulfinate. In a further preferred embodiment, a redox initiator, preferably consisting of tert-butyl hydroperoxide and sodium ascorbate, is used in the emulsion polymerization of the graft copolymer. In another preferred embodiment, a redox initiator, preferably consisting of cumyl hydroperoxide, glucose and iron(II)sulfate, is used in the emulsion polymerization. Examples for azo-initiators are 2,2'-azobis[2-(2-imidazolin-2-yl)propane], 4,4'-azobis(4-cyanovaleric acid), 2,2'-azobis[2-methyl-N-(2-hydroxyethyl)propionamide], 2,2'-azobis[N-(2-carboxyethyl)-2-methylpropionamidine].

Typically, the at least one initiator is employed in an amount of from 0.1 to 1% by weight, based on the total weight of the monomers used for the emulsion polymerization of graft base B1 in step a). Typically, the amount of initiator depends on the molar weight desired and can be selected by a skilled person.

Further, customary buffer substances can be used in emulsion polymerization of step a) to adjust the pH to the preferred range of from 4 to 11. For example the buffer substance might be a compound selected from sodium hydrogencarbonate or sodium carbonate, or mixtures. Typically, at least one molecular weight regulator, such as mercaptan, e.g. tert.-dodecylmercaptan or n-dodecyclmercaptan, terpinol or dimeric α-methylstyrene, can be used in an amount of 0.1 to 3% by weight, based on the total weight of the monomers used for the emulsion polymerization.

Typically, the feeding time for the monomers B11 and optionally B12 and/or B13 is at least 3 hours, preferably at least 8 hours and less than 20 hours, preferably at least 8 hours and less than 16 hours. Typically, the step a) can be carried out at a temperature from 20 to 160° C., preferably from 25° C. to 100° C., more preferably 40° C. to 90° C. (e.g. average temperature during polymerization or end temperature). During emulsion polymerization reaction typical temperature management can be applied, like an isothermal process. Preferably the polymerization is conducted in a way to keep the temperature difference between begin and end of the reaction less than 20° C., preferably less than 15 and most preferred less than 5° C. Typically, the step a) can be carried out at pressures between 0 and 18, preferably 0 and 15 bar (gauge pressure). Generally, the process conditions, such as concentrations, temperature and feeding time, can be selected according to processes known to those skilled in the art.

Typically the solid content of the graft base B1 obtained as latex in step a) is in the range of 25 to 50% by weight, particularly preferably of 30 to 45% by weight, based on the total of graft base B1 latex.

Preferably, the particle size $D_{50}$ of the graft base B1 obtained as latex in step a) is equal or less than 180 nm, preferably in the range of from 50 to 120 nm, particularly preferably 70 to 110 nm.

Preferably, the gel content of the graft base B1 obtained as latex in step a) is in the range of 30 to 98% by weight, more preferably 50 to 95% by weight, based on the water insoluble solids of the latex. For example, the gel content can be determined according to the wire cage method in toluene (see Houben-Weyl, Methoden der Organischen Chemie, Makromolekulare Stoffe, part 1, page 307, 1961, Thieme Verlag Stuttgart). The gel contents of graft base B1 latex A can be adjusted in a manner known in principle, e.g. by applying suitable reaction conditions (e.g., high reaction temperature and/or polymerization up to high conversion) or addition of substances with a cross-linking effect for achieving a high gel content, or addition of molecular-weight regulators (for example n-dodecylmercaptan or tert-dodecylmercaptan) for achieving a low gel content).

Step a) may include the optional step of agglomeration of the graft base B1 latex particles by addition of the at least one agglomerating component B14. The preferred embodiments of agglomerating component B14 and the particle size distribution of agglomerated graft base B1 are described above. Typically, the agglomerating component B14, e.g. an agglomerating copolymer as described above or an acid anhydride, is added in an amount 0.1 to 6%, preferably 0.1 to 5%, preferably 0.5 to 2% (referring to solids of graft base B1).

Generally, the optional agglomeration using an agglomeration latex is carried out at a temperature in the range of 20° C. to 120° C., preferably 30° C. to 100° C., more preferably 30° C. to 75° C. and typically at pressures between 0 and 6 bar, preferably 0 and 3 bar(gauge pressure). The addition of agglomerating component B14 may be effected at once or stepwise, continuously or with a feed profile over a particular time period. According to a preferred embodiment the addition of agglomerating component B14 is effected such that 1/1 to 1/100 of the total amount of B14 is added to the graft base B1 polymer latex per minute. Preferably, there is a waiting time afterwards which is preferably from 1 minute to 6 hours, for example from 1 minute to 2 hours, particularly preferably from 10 to 60 minutes.

Optionally, electrolytes may be added in the agglomeration step. For example useful electrolytes include inorganic chlorides, sulfates, hydroxides, and carbonates. Particular preference is given to using hydroxides, and carbonates. According to one of the particularly preferred embodiments KOH is used as the electrolyte. According to another preferred embodiment NaOH is used as the electrolyte. However, it is also possible to employ mixtures of two or more electrolytes. This may be advantageous, for example, when the growth of the rubber particles during agglomeration need to be controlled precisely. Hence it may be useful, for example, to employ mixtures of LiOH with KOH or mixtures of LiOH with NaOH. It is likewise preferred to use mixtures of KOH and NaOH. The electrolytes are generally dissolved prior to addition. A preferred solvent is the aqueous phase. Preference is given to using diluted solutions, for example solutions having a concentration in the range of from 0.001 to 0.1 g electrolyte/ml of solvent, in particular from 0.001 to 0.05, preferably 0.001 to 0.03, more preferably 0.001 to 0.025 g electrolyte/ml of solvent. The addition of the electrolytes may be effected prior to the addition of the at least one agglomerating component B14, simultaneously therewith or separately therefrom. It is also possible to premix the electrolytes in the dispersion of copolymer B. According to a preferred embodiment the addition of the electrolytes is carried out prior to the addition of agglomerating component B14. The electrolyte is generally employed in an amount in the range of from 0.01 to 4% by weight, preferably 0.05 to 2.5% by weight, in particular 0.1 to 1.5% by weight, based on solid content of graft copolymer B1.

In another embodiment the agglomeration is carried out with at least one acid anhydride (e.g. acetic acid anhydride) at a temperature from 0 to 90° C., preferably 15 to 70° C., wherein a mixture of acid anhydride and water in a mass ratio of 1:5 to 1:50, preferably 1:7.5 to 1:40, particularly preferably 1:10 to 1:30 is applied to the graft base B1 latex.

Step b)—Graft Polymerization

Step b) of the inventive process encompasses preparation of the at least one graft copolymer B via emulsion polymerization, preferably via aqueous free-radical emulsion polymerization, of the at least one monomer B21 and optional B22 in the presence of the at least one graft base B1.

Often the graft polymerization of step b) to obtain one or more graft shells B2 can be carried out in the same system, e.g. the same vessel, like the emulsion polymerization of step a) to obtain at least one graft base B1. In particular step b) can be carried out in the same vessel as step a) directly afterwards step b) (without any isolation or purification step). Additional additives, like surfactants, pH buffers and initiators as described above might be added in step b), if necessary. In particular additional initiator is added in step b). Generally, the embodiments concerning selection of surfactants, buffers, initiators and molecular weight regulators, as described above for step a) apply accordingly to step b). The amounts of additives given for step a) refers to the same amounts of additives, based on the total weight of the graft copolymer B (solid content) for step b). Generally, the embodiments concerning process conditions, such as temperature, pressure etc, as described above for step a) apply accordingly to step b).

In step b) the monomers of the graft shell B2, in particular monomers B21 and B22, can be added at once to the reaction mixture or step-wise in several steps, preferably in a continuous way, added during polymerization. When monomers B21 and/or B22 are added in several steps typically a multi layered graft shell B2 is obtained.

The monomers B21 and optionally B22 (in particular styrene as B21 and acrylonitrile as B22) may preferably be added simultaneously with constant feed rates and with a constant ratio of the feed rates of B21 and B22. It is also preferred to use variable feed rates for the monomers C11 and C12 and variable ratios of the feed rates for the monomers B21 and B22 according to the teaching of the application WO 2015165810 A1. Typically, the feeding time for the monomers B21 and B22 is in the range of 1 to 10 hours, preferably in 1.5 to 6 hours.

In a preferred embodiment the emulsion polymerization in step b) is carried out by feeding from 55 to 90% by weight, preferably from 60 to 80% by weight, particularly preferably from 65 to 75% by weight, based on the total weight of monomers B21 and B22, of monomers B21 and B22 in the first half of the total monomer feeding time; and the remaining amount of monomers B21 and B22 is fed in the second half of the total monomer feeding time. In another embodiment up to 30% by weight of monomers B21 and B22 are provided together with the graft base B1 first and remaining amount of monomers B21 and B22 is fed continuously or in the above described manner afterwards.

Typically, the at least one surfactant is employed in an amount of from 0.1 to 3% by weight, preferably from 0.2 to 1% by weight, based on the total weight of the graft copolymer B (solid content).

In particular at least one polymerization initiator as described above is added in step b). In particular at least one inorganic peroxodisulfate salt, preferably sodium peroxodisulfate and/or potassium peroxodisulfate is used in the emulsion polymerization of step b). Typically, the at least one initiator is employed in an amount of from 0.1 to 1% by weight, based on the total weight of the monomers used for the emulsion polymerization of graft base B1 in step a).

Further, customary buffer substances as described above can be used in emulsion polymerization of step b) to adjust the pH to the preferred range of from 6 to 10.

Typically, the graft polymerization in step b) can be carried out at a temperature from 25 to 160° C., preferably 40 to 90° C. (e.g. average temperature during polymerization or end temperature). During emulsion polymerization reaction typical temperature management can be applied as described for step a) above. Typically, the step a) can be carried out at pressures between 0 and 18, preferably 0 and 15 bar (gauge pressure).

In a preferred embodiment the polymerization temperature in step b) is in the range of 40° C. to 85° C., wherein the polymerization starts at a temperature below 40° C., and wherein the graft polymerization in step b) is preferably carried out in such a manner that the temperature difference between the beginning and the end of the graft polymerization of step b) is at least 10° C., preferably at least 15° C. and particularly preferably at least 20° C. Preferably the polymerization temperature in step b) does not exceed 85° C.

Typically the solid content of the graft copolymer B obtained as latex in step b) is in the range of 25 to 50% by weight, particularly preferably of 30 to 45% by weight, based on the total of graft base B1 latex.

Typically the graft copolymer B (obtained as latex in step b)) has an average particle diameter (weight mean particle size $D_{50}$) in the range of 50 to 1000 nm, preferred 90 to 700 nm. The particle size of latex particles can be governed during synthesis by suitable means known in the literature, e.g. DE-A 28 26 925.

Step c)—Precipitation of Graft Copolymer B Latex

Step c) of the inventive process encompasses precipitation of the graft copolymer B by mixing the graft copolymer B latex obtained in step b) with a precipitation solution S comprising at least one multivalent cation, preferably selected from divalent and trivalent cations, more preferably selected from alkaline earth metal cations and aluminum cations. In terms of the present invention a multivalent cation is a cation which have two or more, preferably two, three or four, more preferably two or three, positive charges. Thus, preferably the precipitation solution S comprises at least one cation selected from divalent or trivalent cations.

Preferably, the graft copolymer B obtained in step b) is precipitated using a precipitation solution S comprising at least one multivalent cation, selected from alkaline earth metal cations and aluminum cations, more preferably selected from $Mg^{2+}$, $Ca^{2+}$ and $Al^{3+}$. In particular the precipitation solution S comprises at least one salt of multivalent cation selected from alkaline earth metal salts and aluminum salts including an anion leading to a reasonably soluble salt, for example selected from halogenide (fluoride, chloride, bromide, in particular chloride), and sulfate, more preferably at least one magnesium salt. Preferred salts are selected from magnesium chloride, calcium chloride, aluminum chloride; magnesium sulfate, magnesium sulfate monohydrate (kieserite $Mg[SO_4].H_2O$), magnesium sulfate pentahydrate (pentahydrate $Mg[SO_4].5H_2O$), magnesium sulfate hexahydrate (hexahydrite $Mg[SO_4].6H_2O$) and magnesium sulfate heptahydrate (epsomite $Mg[SO_4].7H_2O$). Magnesium sulfate and its hydrates are especially preferred.

It is also possible that the precipitation solution S comprises one or more acids, for example selected from sulfuric acid and acetic acid.

Typically, the precipitation solution S used in the inventive process is prepared by mixing at least one salt or a saturated solution of the salt described above with water. Typically the precipitation solution S comprises 0.1 to 5% by weight, preferably 0.2 to 1% by weight of the at least one salt. In particular, the salt of the at least one multivalent cation of precipitation solution S is used in an amount of 0.5 to 6% by weight, preferred 1.5 to 5% by weight, more preferred 2 to 4% by weight, based on the ratio of solids of salt to solids of graft copolymer B latex to be precipitated.

In a preferred embodiment in step c) the graft copolymer B latex obtained in step b) is mixed with a precipitation solution S comprising at least one salt of multivalent cation selected from alkaline earth metal salts and aluminum salts, in particular magnesium salts and/or calcium salts, more preferably magnesium sulfate, wherein the precipitation solution S is used in an amount of 0.5 to 6% by weight, preferred 1.5 to 5% by weight, more preferred 2 to 4% by weight, based on the ratio of solids of salt to solids of graft copolymer B latex to be precipitated.

Preferably, in step c) the precipitation solution S is provided firstly, e.g. in a precipitation tank, following the graft copolymer B latex is added into the precipitation solution S under stirring, and afterwards the obtained precipitation mixture is heated up.

Preferably, the amount of the at least one salt of multivalent cation, typically selected from alkaline earth metal salts (e.g. magnesium sulfate), is used in such way that the concentration of the at least one salt of multivalent cation is in the range of 0.01 to 1% by weight, preferably in the range of 0.1 to 1%, more preferably 0.2 to 0.7% by weight, based on the total aqueous phase of the precipitation mixture. The precipitation mixture typically refers to the mixture of graft copolymer B latex obtained in step b) and the precipitation solution S.

Typically, the precipitation in step c) is carried out at temperatures in the range of 20 to 170° C., preferably 40° C. to 140° C., more preferably 60 to 95° C. The temperature during precipitation in step c) may be constant or may vary according to a set profile.

In a preferred embodiment graft copolymer B latex and precipitation solution S are mixed in first vessel at a temperature from 30 to 80° C., preferably from 35 to 75° C.; then the mixture is brought into a second vessel, where the temperature is from 60 to 100° C. and then into a third vessel, where the temperature is from 60 to 100° C. In an especially preferred embodiment the temperature in the second vessel is at least 10° C. lower than in the third vessel and the temperature in the first vessel at least 10° C. lower than in the second vessel.

In another preferred embodiment graft copolymer B latex and precipitation solution S are mixed in first vessel at a temperature from 70 to 100° C., preferably from 80 to 90° C.; then the mixture is brought into a second vessel, where the temperature is from 100 to 150° C., preferably from 110 to 130° C.

In a preferred embodiment the volume of the first vessel is maximum 10% or less of the volume of the second vessel, Typically, the precipitation in step c) is carried out at pressures in the range of 1 to 15 bar. Typically, the residence time in the precipitation vessel is in the range of 1 minute to 20 hours. The precipitation in step c) may be carried out batch-wise or continuously, wherein the latter is preferred.

Preferably the solid content of the graft copolymer B latex used in precipitation step c) is in the range of 5 to 30% by weight, preferably 10 to 25% by weight, more preferably 15 to 20% by weight.

Preferably the solid content of the precipitated dispersion (slurry) obtained in the precipitation step c) (which can be regarded as a mixture of graft copolymer B, and precipitation solution S) is in the range of 5 to 20% by weight, more preferably in the range of 10 to 15% by weight.

Step d)—Addition of Crystallization Additive C

Step d) of the inventive process encompasses the addition of at least one crystallization additive C selected from phosphate compounds having 1 to 25 phosphate units, organic acids and salts thereof, wherein the organic acids have at least two functional groups selected from acidic groups and hydroxyl groups with the proviso that at least one functional group is an acidic group, and wherein the organic acids encompass at most three carbon atoms per acidic group, during and/or after any of steps a), b) and/or c), wherein the crystallization additive C is added in an amount of 0.005 to 1.6% by weight, preferably of 0.01 to 1.2% by weight, more preferably 0.02 to 0.5% by weight, also preferably 0.3 to 1.2% by weight, also preferably 0.4 to 1% by weight, based on the solid content of the at least one graft copolymer B.

Preferred embodiments of crystallization additive C and preferred ranges of concentration of crystallization additive C are described in detail before.

Generally, the at least one crystallization additive C can be added before final mechanical dewatering and optional drying of the precipitated graft copolymer B (i.e. typically before step e). In case that an optional washing step is included in step e), the at least one crystallization additive C can also be added during said optional washing step before terminal dewatering and optional drying.

In another preferred embodiment, the at least crystallization additive C, preferably selected from phosphate compounds having 1 to 25 phosphate units (—[O—P(=O)OH]—), is added to the graft copolymer B during and/or at the end of the dewatering of the precipitated graft copolymer B in step e). Also preferably the at least crystallization additive C is added during and/or at the end of an optional washing step included in step e). Also preferably an aqueous solution of the at least one crystallization additive C, selected from phosphate compounds having 1 to 25 phosphate units as described above, is added to the graft copolymer B during and/or at the end of the dewatering of the precipitated graft copolymer B in step e). In particular the crystallization additive C is present in the aqueous solution used in this embodiment in a concentration from 0.001 to 1 g/ml, preferably 0.01 to 0.5 g/ml, more preferably 0.05 to 0.1 g/ml.

Preferably, the aqueous solution of the at least one crystallization additive C is applied to the dewatered graft copolymer B (e.g. by spraying the solution onto the dewatered graft copolymer B at the end of centrifugation) and the aqueous solution is remained on the polymer. Typically, said graft polymer B is dried afterwards (step e) and the dried graft copolymer B comprises the amount of additive C that corresponds to the amount of additive C applied at the end of dewatering.

In particular, the at least one crystallization additive C, preferably the aqueous solution of the at least one crystallization additive C, is added (e.g. applied by spraying) to the dewatered graft copolymer B having a residual moisture level in the range of 10 to 50% by weight, preferably 20 to 40% by weight, more preferably 25 to 35% by weight.

Typically, the at least one crystallization additive C is added to the graft copolymer B during and/or at the end of the dewatering of the precipitated graft copolymer B in step e) in an amount of 0.01 to 1.2% by weight, preferably 0.1 to 1% by weight, more preferably 0.2 to 0.7% by weight, also preferably 0.3 to 1.2% by weight, also preferably 0.4 to 1% by weight, based on the solid content of the at least one graft copolymer B.

In a preferred embodiment, the at least crystallization additive C is added to the graft copolymer B during and/or at the end of the dewatering of the precipitated graft copolymer B in step e), wherein the dewatering of the precipitated graft copolymer B and/or the addition of at least one crystallization additive C are carried out by means of continuous or batch-wise centrifugation and/or filtration. Preferably, the mechanical dewatering and/or the addition of the at least one crystallization additive C is preferably achieved by means of continuous centrifuging. For example the dewatered graft copolymer B is contacted with an aqueous solution of at least one crystallization additive C after centrifugation, e.g. during and/or at the end of a continuous centrifugation process.

In an preferred embodiment the crystallization additive C is added to the graft copolymer B during and/or at the end of the dewatering of the precipitated graft copolymer B in step e), wherein the crystallization additive C is an aqueous solution of a mixture comprising (preferably consisting of) at least two alkali metal diphosphate salts, preferably selected from trihydrogen diphosphate ($H_3P_2O_7^-$), dihydrogen diphosphate ($H_2P_2O_7^{2-}$), hydrogen diphosphate ($HP_2O_7^{3-}$), and diphosphate, $P_2O_7^{4-}$. Preferably, the crystallization additive C is a mixture comprising (preferably consisting of) disodium dihydrogen diphosphate ($Na_2H_2P_2O_7$) and tetrasodium diphosphate ($Na_4P_2O_7$), preferably in a mass ratio of 0.5:1 to 1:0.5, preferably 0.5:1 to 1:1, more preferably in a mass ratio of 0.75:1 (ratio $Na_2H_2P_2O_7$:$Na_4P_2O_7$).

It has been found that the addition of the at least one crystallization additive C into the graft copolymer B during and/or at the end of the dewatering step, may lead to an optimized surface quality without influencing the overall production process. In particular, if the pH value of the aqueous solution of said additives C is in the range of 6 to 8, more preferably 6.5 to 7.5, the overall production process is influenced minimally.

In another preferred embodiment, the at least crystallization additive C is added to the graft copolymer B latex after its preparation after step b) before step c).

In another preferred embodiment, the at least crystallization additive C is added to the graft copolymer B latex during its preparation in step a) and/or b).

In another preferred embodiment, the at least crystallization additive C is added to the mixture of graft copolymer B latex and precipitation solution S during or after precipitation in step c). In a particularly preferred embodiment the at least one crystallization additive C is added to the graft copolymer B latex before or parallel to the precipitation solution S during step c). Further, it is possible to mix the at least one crystallization additive C with the precipitation solution S prior to precipitation and afterwards add said mixture to the graft copolymer B latex. Typically, this should not be done if addition of crystallization additive C leads to precipitation of any of the components of the precipitation solution S.

Further, it is possible to add the at least one crystallization additive C into the slurry of precipitated graft copolymer obtained after precipitation before dewatering.

In a particularly preferred embodiment at least one crystallization additive C selected from phosphate compounds having 1 to 14, preferably 1 to 9, more preferably 1 to 6 phosphate units of formula —[O—P(=O)OH]— is added to the graft copolymer B latex parallel to the precipitation solution S during step c), wherein the crystallization additive C is added in an amount of 0.01 to 1.2% by weight, preferably 0.02 to 0.5% by weight, also preferably 0.3 to 1.2% by weight, also preferably 0.4 to 1% by weight, based on the solid content of the at least one graft copolymer B.

Furthermore, it is possible to add the complete amount of crystallization additive C in two or more portions, wherein two or more of the above mentioned embodiments may be combined.

Preferably, the at least one crystallization additive C is added as an aqueous solution, preferably as a monodisperse aqueous solution (which do not comprise any solid components). Preferably, all components of crystallization additive C are completely soluble in water, preferably in the aqueous phase of graft copolymer B latex, in particular soluble in the range of 50° C. and 90° C. Preferably, the additives C do not form an insoluble compound in combination with precipitation solution S, which would result in incomplete precipitation of the graft copolymer B latex.

Typically, the crystallization additive C is present in such aqueous solution used in step d) in a concentration of 0.1 g/100 ml water to 400 g/100 ml water, preferably 0.5 g/100 ml water to 200 g/100 ml water, most preferably 1 g/100 ml water to 150 g/100 ml water.

Preferably, an aqueous solution (e.g. aqueous solution of the crystallization additive C) means a solution including a solvent that comprises at least 80% by weight, preferably at least 90% by weight, more preferably at least 95% by weight, water. More preferably, the solvent of the aqueous solution consists of water.

Step e)—Mechanical Dewatering

Step e) of the inventive process encompasses mechanical dewatering, optional washing and/or optional drying of the precipitated graft copolymer B obtained in step d).

Typically, the precipitated graft copolymer B is at least partially dewatered in particular by centrifugation and/or filtration. Preferably, the precipitated graft copolymer B is at least partially mechanically dewatered and separated from the aqueous phase using a centrifuge.

Typically, the graft copolymer B obtained after mechanical dewatering has a residual moisture level in the range of 10 to 50% by weight, preferably 20 to 40% by weight, more preferably 25 to 35% by weight.

The residual moisture level refers to the amount of water given in % by weight, based on the total wet graft copolymer B. Typically the residual moisture level can be determined using suitable apparatus, such as a drying scales. Typically the sample is dried over a given period as long until a constant weight level is maintained. For example the residual moisture level can be determined in an Halogen Moisture Analyzer HR73 from Mettler-Toledo, at 180° C., maintaining a constant weight for 30 seconds. Respectively, the solid content, e.g. the solid content of latices B1 and B, can be measured.

In a further preferred embodiment the graft copolymer B is washed once or several times after mechanical dewatering wherein the separated graft copolymer B is brought in contact with water or a mixture of water and a polar organic solvent miscible with water (optional washing step). After washing the graft copolymer B is typically separated from the water, e.g. by centrifugation.

In a preferred embodiment step e) of the invention comprises the mechanical dewatering of the precipitated graft copolymer B by means of continuous or batch-wise centrifugation and/or filtration. Preferably, the mechanical dewatering of the precipitated graft copolymer B is achieved by means of continuous centrifuging. The precipitated graft copolymer B is typically centrifuged with a centripetal acceleration of from 200 to 1500 g (with g is acceleration due to gravity 1 g=9.81 m/s), preferably from 500 to 1300 g, for a period of from 1 second to 5 minutes, preferably from 1 to 120 seconds.

In another preferred embodiment the inventive process does not include any washing step of the precipitated and dewatered graft copolymer B in step e).

In a particular preferred embodiment the dewatered graft copolymer B is dried in step e), in a known manner, e.g., by hot air or by means of a pneumatic dryer. Drying can for example be carried out in a cabinet dryer or other common known drying apparatus, such as flash dryer or fluidized bed dryer. Typically, the optional drying step is carried out at a temperature in the range of 50 to 160° C.

In a preferred embodiment the dewatered graft copolymer B is dried to below 1% residual moisture by hot air before mixing with other components in step f).

In this preferred embodiment step e) of the inventive process encompasses mechanical dewatering and drying of the precipitated graft copolymer B obtained in step d), wherein.

Preferably, after step e) the graft copolymer B is in form of a dried polymer latex powder having a residual moisture level of less than 5% by weight, preferably less than 2% by weight, more preferably less than 1% by weight.

It is also suitable to mix graft copolymer B in step f) in the form of moist crumb having a residual moisture level of from 1 to 40% by weight, in particular from 20 to 40% by weight, whereupon then the complete drying of the graft copolymers takes place during the mixing process in step f).

In a preferred embodiment, the graft copolymer B is dried as described in EP-A 0 735 077, wherein the precipitated and dewatered graft copolymer B is directly extruded and the residual water is removed from the extruder completely as vapor or partly as vapor and partly in liquid form. Typically, the size and number of salt particles is often particularly high using this drying method. Following, the reduction of visible surface defects resulting from such salt particles can be significantly reduced by the addition of the crystallization additive C according to the inventive process.

In this preferred embodiment steps e) and f) of the inventive process encompass mechanical dewatering, drying and mixing of the precipitated graft copolymer B obtained in step d) with component A and optional the components P and/or K, wherein the precipitated and dewatered graft copolymer B is extruded including addition of component A and optional the components P and/or K and wherein residual water of dewatered graft copolymer is removed from the extruder as vapor and/or in liquid form.

Step f)—Mixing of Components A, B, and Optionally P and/or K

Step f) of the inventive process encompasses mixing of the precipitated graft copolymer B obtained in step e) with component A and optional the components P and/or K, wherein the thermoplastic molding composition is obtained.

Methods and devices for mixing the graft copolymer B with the thermoplastic polymer A and optional the further polymer component P and/or the additive K are known by a skilled person. For examples possible mixing apparatuses for carrying out the compounding are, e.g., discontinuously operating heated internal mixers with or without stamp, continuous kneaders such as continuous internal mixers, screw kneaders with axially oscillating screws, Banbury mixers, continuous extruders and roll mills, mixing mills with heated rolls and calander. Typically step f) encompasses melt-compounding and/or melt-extrusion and can typically be carried out using one or more kneaders, extruders and/or twin shaft screw. For the melt extrusion, for example single- or twin-screw extruders are particularly suitable. A twin-screw extruder is preferred. In some cases, the mechanical energy introduced during mixing by the mixing device already causes a melting of the mixture, so that the mixing device does not need to be heated.

The mixing in step f) may be carried out successively or simultaneously. Furthermore it is suitable to mix some or all of the components at a temperature of 15 to 40° C., in particular at room temperature, in a first step, and afterwards raising the temperature up to 200 to 300° C., optionally under addition of further additives, in a second step.

Preferably the mixing in step f), in particular the mixing of the dried graft copolymer B, the thermoplastic polymer A and optional further components P and/or K, is carried out at temperatures in the range of 100 to 400° C., preferably 180 to 300° C. Typically, said temperature depends on the chemical and physical properties of components. Typically, it should be selected so that a substantially molten polymer mixture is achieved. Substantially in this context the term "molten" means that all components, in particular the polymeric components, are molten except those which should not be molten, e.g., glass fibers or pigment particles. On the other hand, the temperature should not be unnecessarily high in order to avoid thermal damage to the polymer mixture. The mechanical energy introduced may be so high that the mixing device must be even cooled. The mixing apparatus is usually operated at temperatures from 150 to 400° C., preferably 180 to 300 C and has typically different temperature zones as is known to those skilled in the art.

Thermoplastic Molding Composition

Furthermore, the present invention is directed to a thermoplastic molding composition obtainable (or obtained) by the inventive process as described above.

In particular the inventive thermoplastic molding composition is obtainable by the inventive process, wherein at least one alkali metal salt of an phosphate compound as described above is used as crystallization additive C, and wherein the graft copolymer B included in the thermoplastic molding composition comprises the alkali metals in an amount from 100 to 3,000 ppm, preferably 500 to 2,500 ppm, more preferably 750 to 2,000 ppm, based on the dried graft copolymer B or preferably based on the solid content of graft copolymer B. More preferably, at least one sodium salt of an phosphate compound as described above is used as crystallization additive C, and the graft copolymer B included in the thermoplastic molding composition comprises sodium in an amount from 100 to 3,000 ppm, preferably 500 to 2,500 ppm, more preferably 750 to 2,000 ppm, based on the dried graft copolymer B or preferably based on the solid content of graft copolymer B.

In particular the inventive thermoplastic molding composition is obtainable by the inventive process, wherein at least one phosphate compound as described above is used as crystallization additive C, and wherein the graft copolymer B included in thermoplastic molding composition comprises phosphor (P) in an amount from 200 to 5,000 ppm, preferably 500 to 3,000 ppm, more preferably 550 to 2,500 ppm, based on the dried graft copolymer B or preferably based on the solid content of graft copolymer B.

A preferred embodiment is directed to a thermoplastic molding composition obtainable by the inventive process, wherein at least one sodium salt of an phosphate compound as described above is used as crystallization additive C, and the graft copolymer B included in the thermoplastic molding composition comprises sodium in an amount from 100 to 3,000 ppm, preferably 500 to 2,500 ppm, more preferably 750 to 2,000 ppm, and phosphor in an amount from 200 to 5,000 ppm, preferably 500 to 3,000 ppm, more preferably 550 to 2,500 ppm, based on the dried graft copolymer B or preferably based on the solid content of graft copolymer B.

If not defined otherwise, the term ppm means mg/kg according to the present invention.

Preferably the molar ratio of alkaline metal ions (in particular of sodium ions) to earth alkaline metal ions (in particular of magnesium and/or calcium ions, more preferably of magnesium ions) in the graft copolymer B is in the range of 0.85 to 3, preferably from 0.9 to 2.5, more preferably 1 to 2.5. In a preferred embodiment the molar ratio of alkaline metal ions to earth alkaline metal ions in the graft copolymer B is equal or more than 1.0. Typically, the earth alkaline metal ions derive from the precipitation solution S used in the precipitation step c).

Typically the alkaline metal content and the phosphor content in the graft copolymer is determined via atom emission spectroscopy with inductive coupled plasma (ICP-AES) after chemical digestion of the polymer sample in nitric acid (e.g. microwave assisted at 200 bar and about 220° C.) and addition of demineralized water. As a skilled person understands alkali metal and phosphor are present in the thermoplastic molding composition in form of the phosphate compound used in the inventive process as crystallization additive C and/or in form of any conversion product thereof.

In particular the inventive thermoplastic molding composition is obtainable by the process, wherein the at least crystallization additive C (preferably selected sodium salts of an phosphate compound as described above) is added to the graft copolymer B during and/or at the end of the dewatering of the precipitated graft copolymer B in step e).

It was found that the graft copolymer B and the thermoplastic molding compositions obtainable by the inventive process exhibit a specific structure of salt inclusions that results in less surface defects. In particular the structure of salt inclusions results to less surface defects in the thermoplastic molding composition visible to the human eye without tools, in particular results to less surface defects after warm-humid storage. The specific structure of the salt inclusion in the graft copolymer B and in the inventive thermoplastic molding compositions might include smaller salt inclusions, salt inclusion of other chemical composition, or salt inclusion having other crystallinity compared to the salt inclusions in thermoplastic molding compositions obtained by a process according to the state of the art, i.e. without the inventive use of the crystallization additive C.

The described inventive thermoplastic molding compositions can be used for the production of molded articles such as sheets or semi-finished products, films, fibers or foams. Processing may be carried out using the known processes for thermoplastic processing, in particular production may be effected by thermoforming, extruding, injection molding, calendaring, blow molding, compression molding, press sintering, deep drawing or sintering, preferably by injection molding.

Furthermore, the present invention is directed to the use of at least one crystallization additive C selected from phosphate compounds having 1 to 25 phosphate units, organic acids and salts thereof, wherein the organic acids have at least two functional groups selected from acidic groups and hydroxyl groups with the proviso that at least one functional group is an acidic group, and wherein the organic acids encompass at most three carbon atoms per functional group (in particular per acidic group), for the improvement of the surface quality of a thermoplastic molding composition comprising at least one graft copolymer B prepared by emulsion polymerization, preferably the thermoplastic molding composition as described above.

In particular the inventive use of the at least one crystallization additive C encompasses the addition of the at least one crystallization additive C to the graft copolymer B during or after the preparation of the graft copolymer B by emulsion polymerization, in particular before (final) dewatering and optional drying of the graft copolymer B prepared by emulsion polymerization.

Preferably, the inventive use of the at least one crystallization additive C encompasses the addition of the at least one crystallization additive C to the graft copolymer B during and/or at the end of the dewatering of the precipitated graft copolymer B in step e), also preferably during and/or at the end of an optional washing step included in step e).

Preferably, the inventive use of the at least one crystallization additive C encompasses the addition of the at least one crystallization additive C to the graft copolymer B during or after the preparation of the graft copolymer B by emulsion polymerization, wherein the graft copolymer B latex which is obtained by emulsion polymerization is precipitated using a precipitation solution S comprising at least one multivalent cation.

Preferably, the inventive use of the at least one crystallization additive C encompasses the addition of the at least one crystallization additive C to the graft copolymer B during or after the preparation of the graft copolymer B by emulsion polymerization, wherein the graft copolymer B latex which is obtained by emulsion polymerization is precipitated using a precipitation solution S comprising at least one multivalent cation.

The embodiments of the inventive process as described above apply accordingly in view of the inventive use.

In particular the invention is directed to the use of the crystallization additive C for the improvement of the surface quality after storage under warm-humid environmental conditions. In terms of the present invention "warm-humid environment" or "warm-humid environmental conditions" means conditions encompassing a temperature and humidity which are above the common environmental conditions of 15 to 25° C. and relative humidity of 30 to 60%.

Further, warm-humid environmental conditions can encompass the direct contact with liquid water. Particularly, in terms of the invention "warm-humid environmental conditions" encompass a temperature in the range of 30 to 100° C., preferably 40 to 90° C., particular preferably 50 to 80° C. and a relative humidity in the range of 65 to 100%, preferably 80 to 100% and/or the direct contact of the surface of the thermoplastic molding composition or the molding produced thereof with liquid water at a temperature in the range of 30 to 100° C., preferably 40 to 90° C., particular preferably 50 to 80° C. Typically, the conditions as mentioned are directed to standard pressure of 1013 mbar, or typically to a pressure in the range of 0.9 to 1.1 bar.

Generally, the relative humidity $f_R$ is the percentage ratio of the absolute humidity $f_{max}$ (mass of water vapor in a given volume, e.g. given in g/m$^3$) and maximum humidity $f_{max}$ at a given temperature. The maximum humidity $f_{max}$ describes the maximum mass of water vapour in a specific volume of air at a given temperature (saturation). The relative humidity $f_R$ can be determined according to the following formula:

$$f_R=(f/f_{max})*100\%.$$

As a rule, the value of relative humidity $f_R$ is in the range of 0 to 100%. Having relative humidity $f_R$ above 100% typically results in condensation of water vapor, e.g. as fog.

In particular, in terms of the invention improvement of the surface quality means that only few or no surface defects resulting from salt inclusions, such as spots or cavities, can be detected by the human eye without tools (e.g. magnifying glasses) after storage of at least one hour, preferably after storage over a period of 2 to 28 h, preferably of 5 to 24 h under warm-humid environmental conditions. Preferably, improvement of the surface quality means that less than 100, preferably less than 90, more preferably less than 80, surface defects, such as spots or cavities, can be detected on an area of 150 cm$^2$ by the human eye without tools, after storage under warm-humid environmental conditions as defined above.

Typically, surface defects, can be evaluated based on their size and density according to DIN EN ISO 4628-2. Generally, surfaces without defects, which can be detected by the human eye without tools, are evaluated as category "0" according to DIN EN ISO 4628-2. Generally, surfaces having few small defects, which can be detected by the human eye without tools, are evaluated as category "1 S1" according to DIN EN ISO 4628-2.

In a preferred embodiment of the invention the improvement of the surface quality means that defects (such as spots or cavities), which result from salt inclusions and have a size of 0.3 mm or more, preferably of 0.2 mm or more, also preferably of 0.1 mm or more, are reduced or completely avoided, preferably after warm-humid storage as defined above.

In particular the improvement of the surface quality according to the presence invention encompasses the reduction of salt inclusions which are mainly based on salts composed of components used for preparation of graft copolymer B, in particular based on components of precipitation solution S. More preferably, the improvement of the surface quality according to the presence invention encompasses the reduction of salt inclusions, which are mainly based on magnesium sulfate, and which can be detected by the human eye without tools, preferably after warm-humid storage as defined above. In particular the salt inclusions comprise more than 80% by weight, based on the total weight of salt inclusions, magnesium sulfate.

The invention is explained by the following examples and claims.

EXAMPLES

I. Test Methods

The test methods, which were used for characterization of polymers, are described in the following:
  a) Izod impact strength
  b) Melt flowability (MVR)
  c) Thermal stability (MVR after thermal treatment)
  d) Hydrolytic stability (MVR after hydrolysis)
  e) Yellowness Index (YI)
  f) Gloss
  g) Hardness
  h) Vicat temperature
  i) Particle size by disc centrifuge
  j) Swelling index and gel content
  k) pH value
  l) Thermal stability of graft copolymer B (Scorch Test)
  m) Number of visible surface defects before and after warm-humid storage
  n) Determination of solid content
  o) Sodium, magnesium and phosphor content
  a) Izod-impact strength was tested at 23° C. (if not stated otherwise) according to ISO 180/1U (un-notched) or ISO 180/1A (notched), respectively, on bars mold at a mass temperature of 240° C. and a mold temperature of 80° C. If not stated otherwise, the unit is kJ/m².

b) Melt flowability or melt flow rate (MVR) was determined on a polymer melt at 220° C. with a load of 10 kg or at 260° C. with load of 5 kg according to DIN EN ISO 1133-2:2011. If not stated otherwise, the unit is ml/10 min.

c) Thermal stability was tested as the MVR (see under b) except that the polymer is held exactly before the MVR test for 15 min at the temperature of measurement which is in this case 300° C. The higher the melt flow the higher the chain degradation by elevated temperature.

d) MVR after hydrolysis was tested as the MVR (see under b) except that the granules kept before the MVR measurement in a humid atmosphere (relative humidity >95%) for seven days at 95° C. Afterwards the polymer is dried as usually. The granules should have the same size and shape in order to compare polymers or polymer blends. The higher the melt flow the higher the chain degradation by hydrolysis.

e) Yellowness Index (YI) was tested according to ASTM E313 on plaques molded at a mass temperature of 240° C. and a mold temperature of 80° C.

f) Gloss was tested according to ISO 2813/DIN 67530 on plaques molded at a mass temperature of 240° C. and a mold temperature of 80° C. with a high quality mold to give smooth high quality surface. If not stated otherwise gloss is measured at 20° which is the preferred angel to compare high gloss plastics.

g) Hardness was tested according to DIN ISO 2039-1: 2003-06 on specimen molded at a mass temperature of 240° C. and a mold temperature of 80° C. according to DIN ISO 2039-1:2003-06.

h) Vicat temperature was measured as Vicat B/120 according to DIN ISO 306 on specimen molded at a mass temperature of 240° C. and a mold temperature of 80° C.

i) For particle size, the weight median particle size $D_{50}$ is the diameter which divides the population exactly into two equal parts. 50% by weight of the particles are larger than the weight median particle size $D_{50}$ and 50% by weight are smaller. Analogously, other $D_x$ values can be defined. Broadness of particle size distribution U is defined by:

$$U=(D_{90}-D_{10})/D_{50}.$$

The particle sizes stated here were measured by a disk centrifuge (CPS, DC24000 UHR). Particle size is given in nm if not stated otherwise.

j) The values indicated for the gel content and swelling index are based on the determination according to the wire cage method in toluene (see Houben-Weyl, Methoden der Organischen Chemie, Makromolekulare Stoffe, part 1, page 307 (1961) Thieme Verlag Stuttgart).

k) pH was measured electronically with a 4 point calibration.

l) Thermal stability of graft copolymer B was tested in Scorch Test as follows:

3 g of substance to be tested are placed in an aluminum bowl (diameter 5 cm). Said bowl is placed in a pre-heated oven (precision of temperature ±0.5 K) with weak active ventilation. The temperature of the test is 180° C. if not stated otherwise. The sample is monitored and the time until a color change towards brown is noted.

m) Number of visible surface defects before and after warm-humid storage: Testing plaques are produced by injection molding with 240° C. melt temperature and 80° C. mold temperature. For visual inspection, the surface of the plaques needs to be very smooth. This is achieved by using a mold finely polished as is known by those skilled in the art.

Prior to test plaques are inspected visually. Defect visible before warm-humid storage (if any) are marked. These are the visible surface defects before warm-humid storage. Four plates of 50×75 mm are tested. If not stated otherwise the number of defects refers to 150 cm² surface area. The sample plaques are stored in water for eight hours at 80° C. The surface to be tested has to be under water the whole time. The number of defects is counted from this. The number of visible defects before warm-humid storage is subtracted to give the final result of visible surface defects after warm-humid storage. Surface defects are all visible disturbances e.g. a hard spot visible under the surface or a blister that can be detected by the human eye without tools, e.g. magnifying glasses, under good illumination. The sample plates are beheld at different angels. The person examining the surface has 120% eyesight at close distance if necessary by wearing glasses to correct e.g. farsightness.

n) A small sample of ca. 5 g is placed in an oven at 180° C. for 25 min. Solid content in % by weight is weight after oven drying divided by weight before oven drying.

o) Sodium, magnesium and phosphor content in the graft copolymers B after drying was determined by atom emission spectroscopy with inductive coupled plasma (ICP-AES) after chemical digestion. The dewatered graft copolymers B were dried in a lab oven at 70° C. for 2 days. Afterwards 200 mg of the polymer sample was dissolved in 5 ml nitric acid (microwave assisted at about 200 bar (total pressure of the digestion mixture) and about 220° C.). This method is described in DIN-ISO 17025.

II. Preparation of ABS Polymer Composition

Example 1 (Comparative)

1.1 Preparation of Graft Base B1 Latex

Emulsion polymerizations of 0.18 kg styrene monomer and 2.4 kg of butadiene with 5.7 g sodium persulfate, 9.2 g of sodium hydrogencarbonate, 19.5 g potassium stearate/palmitate (technical mixture) and 21 g tert-dodecyl mercaptane (technical mixture) was carried out in a pressurized vessel; styrene was dosed before butadiene and the tert-dodecyl mercaptane was given in three shots (at the beginning, in the middle and at the end of the butadiene feed) to yield latex with 44% by weight total solid content. Particles had a monomodal particle size distribution, an average size $D_{50}$ of 100 nm, a gel content of 75% and a swelling degree of 24.

1.2 Preparation of Agglomerating Component B14 and Agglomeration

Emulsion polymerizations of 2.3 kg of water, 6 g sodium persulfate, 1 g sodium hydrogen carbonate, 2 g sodium hydroxide (60% of salts were dosed in pre-charge), 22 g surfactant (technical mixture of primary and secondary alkane sulfonates with an averaged chain length of 15 carbon atoms) was done in two steps, wherein 10% of surfactant were dosed in pre-charge and the rest was dosed parallel to the second monomer feed. In first step 0.17 kg ethyl acrylate was polymerized. In second step 71 g methacrylamide and 1.3 kg ethyl acrylate were polymerized. Final solids content of agglomerating latex B14 (agglomerating component B14) was 40%. Broadness of particle size distribution U of agglomerating latex B14 was below 0.2 and particle size $D_{50}$ was 109 nm.

Graft base B1 latex of example 1.1. was partly agglomerated with 3% by weight of a agglomerating latex B14 (solids of agglomerating latex B14 based on solids of rubber B1) at 60° C. to give a bimodal particle size distribution with small fraction having $D_{50}$ value of 134 nm and large fraction having $D_{50}$ value of 482 nm.

1.3 Grafting to form graft copolymer B latex (ABS) 3.3 kg of the resulting agglomerated rubber latex B1 obtained in 1.2 was grafted with 0.79 kg styrene monomer and 0.19 kg acrylonitrile under addition of 14 g potassium stearate/palmitate (technical mixture) and 3 g sodium persulfate. Furthermore, 1.6 kg water was added to give a final solid content of 40% by weight. The resulting graft copolymer dispersion (latex) had a bimodal particle size distribution. The graft copolymer B latex was stabilized with an emulsion of a hindered phenol antioxidant.

1.4 Workup of Graft Copolymer B Latex

The graft copolymer B latex as obtained in 1.3 was added to an aqueous solution of magnesium sulfate (0.80% by weight, referring to mass of pre-charge) at 88° C. over a period of 3 minutes. Graft copolymer B latex solids content was 20.6% by weight (referring to overall mass) and magnesium sulfate content in overall aqueous phase was 0.40% by weight. Afterwards, the precipitation mixture (slurry) was heated to 112° C. and then cooled to room temperature.

The precipitation mixture (slurry) was mechanically dewatered by a centrifuge (forces of about 600 g for 60 s) and the so-obtained ABS-graft copolymer B was dried slowly in a drying rack over two days at 80° C. The graft copolymer B was obtained as fine, dry powder with a residual moisture content of 0.2% by weight.

1.5 Compounding of graft copolymer B powder with thermoplastic polymer A and additives K to form thermoplastic molding composition 47 parts of resulting graft copolymer B powder were compounded with 53 parts thermoplastic polymer A-I, 0.06 parts phenol based stabilizer, 0.12 parts sulfur based stabilizer, and 0.03 parts silicone oil (polydimethylsiloxane) in a twin-screw extruder.

The thermoplastic polymer A-I was a statistical copolymer from styrene and acrylonitrile with a ratio of polymerized styrene to acrylonitrile of 76:24 with a MVR (220° C./10 kg) of 65 mL/10 min. and produced by continuous radical solution polymerization.

The resulting material was tested and results are given in table 2 below.

1.6 Examples 2 to 16

All steps were carried out as in example 1 except that different amounts of the following additives C are added parallel to the magnesium sulfate solution in precipitation step (step 1.4 Workup):
C1 orthophosphoric acid $H_3PO_4$;
C2 oxalic acid $C_2H_2O_4$;
C3 citric acid $C_6H_8O_7$;
C4 tetrasodium diphosphate $Na_4P_2O_7$ and orthophosphoric acid (mass ratio 2:1);
C5 tetrasodium diphosphate and oxalic acid (mass ratio 1.8:1);
C6 disodium dihydrogen diphosphate, $Na_2H_2P_2O_7$;
C7 sodium hexametaphosphate, $Na_6P_6O_{18}$;
C8 tetrasodium diphosphate, $Na_4P_2O_7$;
C9 neutralized polyphosphate of medium chain-length (technical mixture, commercially available as Calgon® N from BK Giulini GmbH);
C10 sodium hydrogen carbonate, $NaHCO_3$;
C11 disodium hydrogen phosphate, $Na_2HPO_4$.

The examples 1 to 16 are summarized in the following table 1, wherein the amount of additives C given in % by weight referring to solids (solid content) of graft copolymer B. Further, the amount of additives C given in % by weight is based on the solids of additive C.

TABLE 1

Examples 1 to 16

| Example | Comment | Crystallization additive C | Amount C [% by weight] |
|---|---|---|---|
| 1 | Comparative | No | — |
| 2 | Inventive | C1 | 0.142 |
| 3 | Inventive | C2 | 0.142 |
| 4 | Inventive | C3 | 0.142 |
| 5 | Inventive | C4 | 0.142 |
| 6 | Inventive | C5 | 0.142 |
| 7 | Inventive | C6 | 0.142 |
| 8 | Inventive | C7 | 0.142 |
| 9 | Inventive | C8 | 0.142 |
| 10 | Comparative | C9 | 0.142 |
| 11 | Comparative | C10 | 0.142 |
| 12 | Comparative | C11 | 1.70 |
| 13 | Inventive | C11 | 0.568 |
| 14 | Inventive | C11 | 0.142 |
| 15 | Inventive | C11 | 0.0355 |
| 16 | Comparative | C11 | 0.00444 |

The resulting ABS material according to examples 1 to 16 was tested and the results are given in table 2 below.

TABLE 2

Test results for ABS polymer compositions, Ex. 1-Ex.16

| | | Defects before warm-humid storage | Defects after warm-humid storage | Scorch test (powder) | Notched Izod RT | Un-notched Izod RT | Gloss 20° | YI |
|---|---|---|---|---|---|---|---|---|
| | | | | Test method | | | | |
| | | m) | m) | l) | a) | a) | f) | e) |
| | | | | Unit | | | | |
| Ex. | | number/ 150 cm² | number/ 150 cm² | min | [kJ/m²] | [kJ/m²] | | |
| 1 | Com | 12 | 386 | 105 | 36.5 | 192 | 89.9 | 25.2 |
| 2 | Inv | 0 | 72 | 245 | 36.0 | 201 | 90.2 | 25.5 |
| 3 | Inv | 0 | 114 | 98 | 36.8 | 199 | 90.2 | 24.9 |
| 4 | Inv | 0 | 70 | 115 | 36.4 | 199 | 89.7 | 25.0 |
| 5 | Inv | 1 | 87 | 301 | 36.0 | 200 | 91.0 | 25.7 |
| 6 | Inv | 0 | 66 | 316 | 35.9 | 198 | 90.4 | 25.8 |
| 7 | Inv | 0 | 69 | 297 | 36.5 | 199 | 90.9 | 25.4 |
| 8 | Inv | 1 | 80 | 309 | 37.1 | 200 | 91.2 | 25.2 |
| 9 | Inv | 0 | 83 | 314 | 36.0 | 198 | 89.8 | 25.8 |
| 10 | Com | 12 | 564 | 245 | 36.1 | 193 | 90.1 | 25.8 |
| 11 | Com | 7 | 374 | 108 | 35.9 | 195 | 89.9 | 25.3 |
| 12 | Com | — | 349 | 307 | 33.2 | 196 | 89.7 | 26.1 |
| 13 | Inv | — | 108 | 293 | 35.5 | 200 | 90.4 | 25.4 |
| 14 | Inv | — | 59 | 312 | 36.5 | 199 | 90.3 | 25.2 |
| 15 | Inv | — | 65 | 269 | 36.3 | 199 | 90.9 | 25.6 |
| 16 | Com | — | 363 | 132 | 36.6 | 201 | 91.1 | 25.0 |

(Com = comparative example, Inv = inventive example)

Comparison of results for comparative example 1 (no crystallization additive C) with the results of inventive examples 2 to 9 (0.142% by weight of one of inventive additives C1 to C8) demonstrates the strong reduction of the number of visible surface defects after warm-humid storage by specific additives C. The different additives C1 to C8 based on organic acids, e.g. oxalic acid, citric acid, or phosphate compounds, e.g. disodium dihydrogen diphosphate, sodium hexametaphosphate, tetrasodium diphosphate, phosphoric acid, or combinations thereof are almost equally effective. The number of visible surface defects before warm-humid storage is much smaller and in most cases zero.

Comparative example 10 (neutralized polyphosphate of medium chain-length, Calgon N®) demonstrates that polyphosphates with too long chains, i.e. chains having more than 25 phosphate units do not show a positive effect on number of visible surface defects after warm-humid storage. In fact, the number of defects is even higher than for the comparative example 1 which was carried out without additive.

Comparative example 11 (addition of sodium hydrogen carbonate) demonstrates that hydrogen carbonate does not have a positive effect on surface quality after warm-humid storage.

Furthermore, unnotched Izod impact strength is lower for the comparative examples 1 and 10 compared with the inventive examples 2 to 9.

Furthermore, the examples to which a phosphate compound was added show an increased thermal stability of ABS powder (see results of Scorch test in table 1 and 2 above). This additional positive effect is observed already at low phosphate content, whereas high amounts do not give additional advantage. Interestingly, a better thermal stabilization of ABS/PC blend was found for all inventive examples (see thermal stability according to test method c) given in table 3 below). The thermal stability of ABS/PC blends is mainly based on reduced chain degradation at high temperature, and not on the oxidation of double bonds as in case of ABS powder.

1.7 Examples 16a and 16b

All steps were carried out as in example 1 except that different amounts of additive C12

C12 mixture of disodium dihydrogen diphosphate, $Na_2H_2P_2O_7$ and tetrasodium diphosphate, $Na_4P_2O_7$ (mass ratio 0.75:1)

are added during the dewatering step at the end of the centrifugation (step 1.4 workup). The crystallization additive C12 was dissolved in water and the resulting aqueous solution (0.06 g/mL C12 in water) was added at the end of the centrifugation to the wet powder. The additive solution applied to the dewatered graft copolymer remained on the polymer and the polymer was dried as described under step 1.4 (workup). The crystallization additive C12 was added in an amount of 0.3% by weight (example 2a) or 0.6% by weight (example 2b), based on the solid content of the additive C12 and regarding to the total solid content of the polymer.

The resulting ABS copolymers were compounded as described in example 1.5 with the thermoplastic polymer A-I and tested regarding the surface properties (defects after warm and humid storage and the yellowness index YI as described under I. Test Methods). The content of Na, Mg, and P in the dried graft copolymer B was determined as described above. The results are given in Table 2a. The comparative sample 1 (without the inventive addition of additive C) is the same as in Table 2 above.

TABLE 2a

Test results for ABS polymer compositions, Ex. 1, Ex. 16a and Ex. 16b

| Ex. | | Amount C12 | Defects after warm-humid storage | YI | Na content | Mg content | P content |
|---|---|---|---|---|---|---|---|
| | | | Test method | | | | |
| | | m) | e) | o) | o) | o) | |
| | | Unit | | | | | |
| | | [% by weight]* | number/ 150 cm$^2$ | | ppm** | ppm** | ppm** |
| 1 | Com | 0 | 386 | 25.2 | 165 | 960 | <1 |
| 16a | Inv | 0.3 | 30 | 25.7 | 770 | 950 | 560 |
| 16b | Inv | 0.6 | 15 | 27.4 | 1400 | 930 | 1000 |

(Com = comparative example, Inv = inventive example)
*calculated on solid content C12 and based on solid content of ABS
**based on the dried graft copolymer B

III. Preparation of Polymer Blends ABS/PC

Example 17 (Comparative)

The ABS copolymer obtained according to example 1 was compounded with polycarbonate P1 as further polymer component P, an thermoplastic polymer A-II and additives K, wherein the following polymers were used:

Further Polymer Component P1:

Linear polycarbonate based on bisphenol-A with weight average molar mass of 27500 (size exclusion chromatography in methylene chloride at 25° C.)

Additional Thermoplastic Polymer A-II:

Statistical copolymer from styrene and acrylonitrile with a ratio of polymerized styrene to acrylonitrile of 76.5:23.5 with a MVR (220° C./10 kg) of 30 mL/10 min. and produced by continuous radical solution polymerization 48.40 parts ABS copolymer from example 1 were compounded with 44.65 parts P1, as further polymer component P; 5.90 parts A-II, 0.75 parts pentaerythrityl tetrastearate, 0.15 parts of a blend of 20% octadecyl-3-[3,5-di-tert-butyl-4-hydroxyphenyl]propionate] and 80% tris (2,4-ditert-butylphenyl) phosphite, 0.2 parts octadecyl-3-[3,5-di-tert-butyl-4-hydroxyphenyl]propionate] and 0.1 parts citric acid to yield a thermoplastic polymer blend. The resulting material was tested and results are given in table 3.

Examples 18 to 20

Polymer was compounded as in example 17 with exception of the ABS polymer which was taken from example 4, 5 and 7 instead of example 1. The resulting material was tested and results are given in table 3.

TABLE 3

ABS/PC blend and test results

| | | | Example | | | |
|---|---|---|---|---|---|---|
| | | | 17 | 18 | 19 | 20 |
| | | | ABS copolymer | | | |
| | Test | Unit | Ex. 1 Com | Ex. 4 Inv | Ex. 5 Inv | Ex. 7 Inv |
| Defects after warm-humid storage in corresponding ABS (as in table 2) | m) | number/ 150 cm$^2$ | 386 | 70 | 87 | 69 |

TABLE 3-continued

ABS/PC blend and test results

| | | | Example | | | |
|---|---|---|---|---|---|---|
| | | | 17 | 18 | 19 | 20 |
| | | | ABS copolymer | | | |
| | Test | Unit | Ex. 1 Com | Ex. 4 Inv | Ex. 5 Inv | Ex. 7 Inv |
| Defects after warm-humid storage | m) | number/ 150 cm$^2$ | 57 | 13 | 15 | 16 |
| Notched Izod (RT) | a) | kJ/m$^2$ | 45.7 | 46.1 | 45.4 | 46.3 |
| Notched Izod (−30° C.) | a) | kJ/m$^2$ | 30.2 | 41.2 | 40.9 | 41.2 |
| MVR (260° C./5 kg) | b) | ml/10 min | 10.9 | 9.8 | 9.4 | 9.9 |
| Thermal stability | c) | ml/10 min | 59.6 | 42.6 | 41.8 | 34.1 |
| Hydrolytic stability | d) | ml/10 min | 20.0 | 18.1 | 17.0 | 20.1 |
| Hardness | g) | | 102.0 | 102.3 | 101.6 | 101.5 |
| Gloss (20°) | f) | | 88.8 | 88.3 | 88.4 | 88.8 |
| YI | e) | | 26.6 | 25.9 | 26.9 | 26.4 |
| Vicat B/120 | h) | ° C. | 110.5 | 110.4 | 109.6 | 110.0 |

(Com = comparative example, Inv = inventive example)

VI. Preparation of ASA Polymer Composition

Example 21

1. Preparation of Graft Base B1' Latex

A reaction vessel was charged with 90 parts of demineralized water, 0.5 parts of the sodium salt of a $C_{12}$-to $C_{18}$-paraffin sulfonic acid and 0.25 parts sodium bicarbonate. When the temperature in the reaction vessel reached 59° C., 0.2 parts of sodium persulfate, dissolved in 5 parts of demineralized water, were added. A mixture of 60 parts butyl acrylate and 1.5 part tricyclodecenylacrylate was added within a period of 210 min. Afterwards the reaction was continued for 60 min. Finally the polymer dispersion had a total solid content of 40% by weight and the latex particles had a particle diameter of 75 nm (average size $D_{50}$).

2. Grafting to Form Graft Copolymer Latex B' (ASA)

An amount of 150 parts of the graft base latex B1' was added to the reaction vessel together with 90 parts of demineralized water and 0.1 parts of sodium persulfate, dissolved in 5 parts of demineralized water. Within a period of 190 min a mixture of 30 parts of styrene and 10 parts of acrylonitrile was added at a temperature of 61° C., followed by a post polymerization time of 60 min at 65° C. A polymer dispersion with a total solid content of 35% by weight was obtained. The latex particles had a diameter 90 nm (average size $D_{50}$).

3. Workup of Graft Copolymer Latex B'

0.1 parts of a MgSO$_4$ solution (20% by weight) were mixed with 6.67 parts demineralized water. An amount of 20% of this solution was used as pre-charge and heated to 60° C. 1 part of a polymer latex B' and the remaining diluted MgSO$_4$ solution were added separately within 10 min, while the temperature was kept at 60° C. Then the resulting mixture was heated to 92° C. for 5 min. The resulting slurry was transferred to a centrifuge, having a diameter of 400 mm, and centrifuged at 1500-2000 rpm for 60 s and washed during this process with 0.3 parts demineralized water.

The resulting material was dried in an oven at 70° C. for 2 days, wherein the dried ASA-copolymer B' powder was obtained.

4. Compounding of Graft Polymer B' with Thermoplastic Polymer A-III to Form Thermoplastic Molding Compositions The dried ASA-copolymer B' powder was compounded using a twin screw extruder with the thermoplastic polymer (SAN-Copolymers) A-III:

Component A-III (thermoplastic polymer A): Statistical copolymer from styrene and acrylonitrile with a ratio of polymerized styrene to acrylonitrile of 67:33 with a MVR (220° C./10 kg) of 16 mL/10 min and produced by continuous radical solution polymerization.

The composition of the blend was 60% by weight of A-III and 40% by weight ASA-copolymer B".

The resulting material was tested against the surface quality and the results are given in Table 4 (comparative example 21).

Example 22

1. Preparation of Graft Base B1" Latex

The reaction vessel was charged with 70 parts of demineralized water, 0.5 parts of latex B1' (see Example 21) and 0.25 parts of sodium bicarbonate. After heating the reaction vessel to 60° C., 0.15 parts of sodium persulfate, dissolved in 5 parts demineralized water, were added to the reaction mixture. A mixture of 60 parts butyl acrylate and 1 part tricyclodecenylacrylate was added within a period of 210 min. In parallel to the first feed a solution of 0.5 parts of the sodium salt of a $C_{12}$-to $C_{18}$-paraffin sulfonic acid in 15 parts demineralized water was also added over a period of 210 min. After 200 min, from starting the feed, the temperature was ramped to 65° C. Afterwards the reaction was continued for 60 min at 65° C. Finally the polymer dispersion has a total solid content of 40% by weight and the latex particles had a particle diameter of 450 nm (average size $D_{50}$).

2. Grafting to Form Graft Copolymer Latex B" (ASA)

An amount of 155 parts of the graft base B1" was added to the reaction vessel together with 90 parts of demineralized water, 0.1 parts of the sodium salt of a $C_{12}$-to $C_{18}$-paraffin sulfonic acid and 0.15 parts of sodium persulfate, dissolved in 5 parts of demineralized water. The reaction mixture was heated to 61° C. Within a period of 60 min 15 parts of styrene were added at a temperature of 61° C., followed by a post polymerization time of 90 min, where the temperature was increased from 61 to 65° C. Then a mixture of 20 parts of styrene and 5 parts of acrylonitrile was added to the reaction over a period of 150 min. The reaction was continued at 65° C. for another 60 min. A polymer dispersion with a total solid content of 35% by weight was obtained. The latex particles had a diameter of 500 nm (average size $D_{50}$).

3. Workup of Graft Copolymer Latex B"

0.1 parts of a MgSO$_4$ solution (20% by weight) was mixed with 6.67 parts demineralized water. An amount of 20% of this solution was used as pre-charge and heated to 88° C. 1 part of a polymer latex B" and the remaining diluted MgSO4 solution were added separately within 10 min, while the temperature was kept at 88° C. Then the resulting mixture was heated to 99° C. for 5 min. The resulting slurry was transferred to a centrifuge, having a diameter of 400 mm, and centrifuged at 1500-2000 rpm for 60 s and washed with 0.35 parts of demineralized water.

The resulting material was dried in an oven at 70° C. for 2 days, wherein the dried ASA-copolymer B" powder was obtained.

4. Compounding of Graft Polymer B″ with Thermoplastic Polymer A-III to Form Thermoplastic Molding Compositions The dried ASA-copolymer B″ powder was compounded using a twin screw extruder with the thermoplastic polymer (SAN-Copolymer) A-Ill. The composition of the blend was 60% by weight of A-III and 40% by weight ASA-copolymer B″.

The resulting material was tested against the surface quality and the results are given in Table 4 (comparative example 22).

Examples 23a-23c

All steps of examples 23 were carried out as described in example 21 except the addition of different amounts of the crystallization additive C12 mixture of disodium dihydrogen diphosphate, $Na_2H_2P_2O_7$ and tetrasodium diphosphate, $Na_4P_2O_7$ (mass ratio 0.75:1)

The additive 012 were added during the dewatering step at the end of the centrifugation (steps 3 workup in example 21). The additive C12 was dissolved in demineralized water (0.06 g/mL 012 in water) and the aqueous solution was added at the end of the centrifugation to the wet powder. The additive solution applied to the dewatered graft copolymer remained on the polymer and the polymer was dried as described under step 1.4 (workup). The additive C12 was added in an amount of 0.4% by weight (23a), 0.8% by weight (23b) or 1.2% by weight (23c) based on solid content of 012 and regarding the total solid content of the graft copolymer B.

The resulting materials were tested in view of the defects after warm and humid storage and the yellowness index YI. The content of Na, Mg, and P in the dried graft copolymer B was determined as described above. The results are given in Table 4.

TABLE 4

Test results for ASA polymer compositions, examples 21, 22 and 23a-23c

| Ex. | | Amount C12 [% by weight]* | Defects after warm-humid storage number/150 cm² | YI | Na content ppm** | Mg content ppm** | P content Ppm** |
|---|---|---|---|---|---|---|---|
| | | | m) | e) | o) | o) | o) |
| | | | | Unit | | | |
| 21 | Com | 0 | 240 | 22.5 | 150 | 1000 | <1 |
| 22 | Com | 0 | 280 | 23.2 | 150 | 1000 | <1 |
| 23a | Inv | 0.4 | 75 | 23.4 | 780 | 900 | 660 |
| 23b | Inv | 0.8 | 15 | 22.8 | 1400 | 990 | 1200 |
| 23c | Inv | 1.2 | 3 | 26.6 | 2100 | 1000 | 2100 |

(Com = comparative example, Inv = inventive example)
*calculated on solid content of C12 and based on solid content of ABS
**based on the dried graft copolymer B

The invention claimed is:

1. A process for the preparation of a thermoplastic molding composition comprising:
A: 5 to 95% by weight, based on the total molding composition, at least on thermoplastic polymer A, which comprises at least one vinylaromatic monomer A1 and optionally at least one further ethylenically unsaturated monomer A2;
B: 5 to 95% by weight, based on the total molding composition, at least one graft copolymer B comprising:
B1: 5 to 95% by weight, based on the graft copolymer B, at least one graft base B1, obtained by emulsion polymerization of:
B11: 70 to 100% by weight, based on the graft base B1, at least one ethylenically unsaturated monomer B11;
B12: 0 to 10% by weight, based on the graft base B1, at least on polyfunctional cross-linking monomer B12, different from B11; and
B13 0 to 30% by weight, based on the graft base B1, at least one further copolymerizable monoethylenically unsaturated monomer B13 different from B11 and B12;
and optional addition of
B14: 0 to 5% by weight, based on the graft base B1, at least one agglomerating component B14,
wherein the sum of B11, B12, B13, and B14 is 100% by weight; and
B2: 5 to 95% by weight, based on the graft copolymer B, at least one graft shell B2, which is obtained by emulsion polymerization in the presence of the at least one graft base B1 of:
B21 50 to 100% by weight, based on the graft shell B2, at least one vinylaromatic monomer B21; and
B22 0 to 50% by weight, based on the graft shell B2, at least one ethylenically unsaturated monomer B22,
wherein the total sum of graft base B1 and graft shell B2 is 100% by weight;
P: 0 to 90% by weight, based on the total molding composition, at least one further polymer component P; and
K: 0 to 40% by weight, based on the total molding composition, at least one additive K;
wherein the process comprises the steps:
a) preparation of the at least one graft base B1 via emulsion polymerization of the at least one monomer B11, and optional B12 and/or B13, and optional addition of the at least one agglomerating component B14;
b) preparation of the at least one graft copolymer B via emulsion polymerization of the at least one monomer B21 and optional B22 in the presence of the at least one graft base B1;
c) precipitation of the graft copolymer B by mixing the graft copolymer B latex obtained in step b) with a precipitation solution S comprising at least one multivalent cation;
d) addition of crystallization additive C during and/or after any of steps a), b), and/or c), wherein the crystallization additive C is a mixture comprising disodium dihydrogen diphosphate ($Na_2H_2P_2O_7$) and tetrasodium diphosphate ($Na_4P_2O_7$) and the crystallization additive C is added in an amount of 0.005 to 1.6% by weight, based on the solid content of the at least one graft copolymer B;
e) mechanical dewatering, optional washing, and optional drying of the precipitated graft copolymer B obtained in step d); and f) mixing of the precipitated graft copolymer B obtained in step e) with component A and optional components P and/or K, wherein the thermoplastic molding composition is obtained.

2. The process of claim 1, wherein the at least one thermoplastic polymer A comprises:
  A1: 60 to 90% by weight, based on A, at least one vinyl aromatic monomer A1, selected from styrene, a(alpha)-methylstyrene, and para-methylstyrene; and
  A2: 10 to 40% by weight, based on A, at least one vinyl cyanide monomer as monomer A2, selected from acrylonitrile and/or methacrylonitrile.

3. The process of claim 1, wherein the at least one graft copolymer B comprises:
  B1: 5 to 95% by weight, based on the graft copolymer B, of at least one graft base B1, which is obtained by emulsion polymerization of:
    B11: 50 to 100% by weight, based on the graft base B1, butadiene and/or isoprene as monomer B11; and
    B13: 0 to 50% by weight, based on the graft base B1, at least one further monomer B13 selected from styrene, α-methylstyrene, acrylonitrile, methacrylonitrile, isoprene, chloroprene, $C_1$-$C_4$ alkyl styrene, (meth)acrylic acid $C_1$-$C_8$-alkyl esters, alkylenglykol-di(meth)acrylate, and divinylbenzene,
    wherein the sum of B11+B13 is 100% by weight; and
  B2: 5 to 95% by weight, based on the graft copolymer B, of at least one graft shell B2, which is obtained by emulsion polymerization in the presence of the at least one graft base B1 of:
    B21 50 to 95% by weight, based on the graft shell B2, of a monomer B21, selected from styrene, a-methylstyrene, and mixtures of styrene and at least one more monomer selected from a-methyl-styrene, p-methylstyrene, and (meth)acrylic acid $C_1$-$C_8$-alkyl esters; and
    B22 5 to 50% by weight, based on the graft shell B2, of a monomer B22, selected from acrylonitrile and mixtures of acrylonitrile and at least one more monomer selected from methacrylonitrile, anhydrides of unsaturated carbon acids, and imides of unsaturated carbon acids,
    wherein the sum of graft base B1 and graft shell B2 is 100% by weight.

4. The process according to claim 1, wherein the at least one graft copolymer B comprises:
  B1: 50 to 90% by weight, based on the graft copolymer B, at least one graft base B1 obtained by emulsion polymerization of:
    B11: 70 to 99.9% by weight, based on the graft base B1, of at least one $C_1$-$C_8$ alkyl(meth)acrylate as monomer B11;
    B12: 0.1 to 10% by weight, based on the graft base B1, of at least on polyfunctional, cross-linking monomer B12; and
    B13 0 to 29.9% by weight, based on the graft base B1, at least one further copolymerizable monoethylenically unsaturated monomer B13 different from B11 and B12,
    wherein the sum of B11, B12, and optional B13 is 100% by weight; and
  B2: 10 to 50% by weight, based on the graft copolymer B, at least one graft shell B2, wherein the at least one graft shell B2 is obtained by emulsion polymerization in the presence of the at least one graft base B1 of:
    B21: 50 to 95% by weight, based on the graft shell B2, at least one monomer B21, selected from styrene, a(alpha)-methylstyrene, or mixtures of styrene and one further monomer selected from a(alpha)-methylstyrene, p-methylstyrene, and $C_1$-$C_4$-alkyl(meth)acrylate; and
    B22: 5 to 50% by weight, based on the graft shell B2, at least one ethylenically unsaturated monomer B22, selected from acrylonitrile or mixtures of acrylonitrile and at least one further monomer selected from methacrylonitrile, acrylamide, vinylmethylether, anhydrides of unsaturated carboxylic acids, and imides of unsaturated carboxylic acids,
    wherein the total sum of graft base B1 and graft shell(s) B2 is 100% by weight.

5. The process of claim 1, wherein the thermoplastic molding composition comprises 5 to 60% by weight, based on the total molding composition, at least one further polymer component P selected from polycarbonates, polyamides, and polyesters.

6. The process of claim 1, wherein in step c) the graft copolymer B latex obtained in step b) is mixed with a precipitation solution S comprising at least one salt of multivalent cation selected from alkaline earth metal salts and aluminum salts, wherein the precipitation solution S is used in an amount of 0.5 to 6% by weight, based on the ratio of solids of salt to solids of graft copolymer B latex to be precipitated.

7. The process of claim 1, wherein the crystallization additive C is added in an amount of 0.01 to 1.2% by weight, based on the solid content of the at least one graft copolymer B.

8. The process of claim 1, wherein the crystallization additive C is added to the graft copolymer B latex before or parallel to the precipitation solution S during step c).

9. The process of claim 1, wherein the crystallization additive C is added to the graft copolymer B latex parallel to the precipitation solution S during step c), wherein the crystallization additive C is added in an amount of 0.01 to 1.2% by weight, based on the solid content of the at least one graft copolymer B.

10. The process of claim 1, wherein the crystallization additive C is added to the graft copolymer B during and/or at the end of the dewatering of the precipitated graft copolymer B in step e).

11. The process of claim 1, wherein an aqueous solution of the at least one crystallization additive C is added to the graft copolymer B during and/or at the end of the dewatering of the precipitated graft copolymer B in step e).

12. The process of claim 1, wherein the steps e) and f) comprise mechanical dewatering, drying, and mixing of the precipitated graft copolymer B obtained in step d) with component A and optional components P and/or K, wherein the precipitated and dewatered graft copolymer B is extruded including addition of component A and optional components P and/or K, wherein residual water of dewatered graft copolymer is removed from the extruder as vapor and/or in liquid form.

13. A thermoplastic molding composition obtained by the process of claim 1.

14. The thermoplastic molding composition of claim 13, wherein the graft copolymer B included in the thermoplastic molding composition comprises sodium in an amount from 100 to 3,000 ppm; and phosphor in an amount from 200 to 5,000 ppm, based on the dried graft copolymer B.

* * * * *